(12) United States Patent
Luo

(10) Patent No.: US 11,389,723 B2
(45) Date of Patent: Jul. 19, 2022

(54) METHOD FOR DISPLAYING BATTLE INTERFACE IN TERMINAL, DEVICE, AND STORAGE MEDIUM THEREOF

(71) Applicant: Tencent Technology (Shenzhen) Company Limited, Guangdong (CN)

(72) Inventor: Jian Luo, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 16/933,721

(22) Filed: Jul. 20, 2020

(65) Prior Publication Data

US 2020/0346115 A1 Nov. 5, 2020

Related U.S. Application Data

(63) Continuation of application No. PCT/CN2019/084716, filed on Apr. 28, 2019.

(30) Foreign Application Priority Data

Jun. 15, 2018 (CN) .......................... 201810618163.4

(51) Int. Cl.
*A63F 13/00* (2014.01)
*A63F 13/5375* (2014.01)
*A63F 13/533* (2014.01)
*A63F 13/69* (2014.01)

(52) U.S. Cl.
CPC ........ *A63F 13/5375* (2014.09); *A63F 13/533* (2014.09); *A63F 13/69* (2014.09)

(58) Field of Classification Search
CPC . A63F 2300/807; A63F 9/0612; A63F 9/1044
See application file for complete search history.

(56) References Cited

U.S. PATENT DOCUMENTS

| | | | | |
|---|---|---|---|---|
| 9,079,097 | B2* | 7/2015 | Hansson | G07F 17/3274 |
| 9,687,729 | B2* | 6/2017 | Hansson | G07F 17/3274 |
| 10,265,612 | B2* | 4/2019 | Hansson | A63F 13/45 |

(Continued)

FOREIGN PATENT DOCUMENTS

| CN | 103316474 A | 9/2013 |
|---|---|---|
| CN | 103402593 A | 11/2013 |

(Continued)

OTHER PUBLICATIONS https://www.youtube.com/watch?v=Unz-V2NGGCg (Year: 2013).*

(Continued)

*Primary Examiner* — David L Lewis
*Assistant Examiner* — Eric M Thomas
(74) *Attorney, Agent, or Firm* — Crowell & Moring LLP

(57) ABSTRACT

A method for displaying a battle interface in a terminal is provided. The method includes: displaying a battle board in a user interface (UI) of a screen; obtaining an $i^{th}$ location switching instruction; eliminating connected to-be-eliminated elements with a same type according to the $i^{th}$ location switching instruction; displaying placeholder identifiers of lattices corresponding to the eliminated elements as a first placeholder identifier; and displaying a winner.

7 Claims, 15 Drawing Sheets

(56) References Cited

U.S. PATENT DOCUMENTS

| 2004/0121830 | A1 | 6/2004 | Alessi |
| 2014/0080556 | A1 | 3/2014 | Knutsson |
| 2014/0349755 | A1 | 11/2014 | Itoh et al. |

FOREIGN PATENT DOCUMENTS

| CN | 104391710 A | 3/2015 |
| CN | 106021291 A | 10/2016 |
| CN | 106163625 A | 11/2016 |
| CN | 106390450 A | 2/2017 |
| CN | 106462916 A | 2/2017 |
| CN | 106861189 A | 6/2017 |
| CN | 107111449 A | 8/2017 |
| CN | 107577414 A | 1/2018 |
| CN | 107952242 A | 4/2018 |
| CN | 108888950 A | 11/2018 |
| EP | 1 484 722 A1 | 12/2004 |
| JP | 2008161361 A | 7/2008 |
| JP | 2008212416 A | 9/2008 |
| JP | 2018-82746 | 5/2018 |

OTHER PUBLICATIONS

Chinese International Search Report dated Jul. 18, 2019 for corresponding PCT Patent Application No. PCT/CN2019/084716.
Chinese Patent Office Action.
Office Action dated Nov. 9, 2021 on Japanese application 2020-559429 with English summary, 8 pages.
Candy Crush Beginner Strategy, Infinity App online, Feb. 12, 2015, http://infinity-app.com/201602/1944, Nov. 29, 2021.
GAME Watch online, https://game.watch.impress.co.jp/docs/news/738066.html, Nov. 29, 2021.
Gamebiz online, https://gamebiz.jp/news/155046, Nov. 29, 2021.
Candy Crush Jelly Saga, wiki, Jan. 22, 2016, https://www.dopr.net/article/5662975471910912, Nov. 29, 2021.
Final Office Action issued in Japanese Application 2020-559429 dated Apr. 18, 2020, 5 pages.
Office Action Summary for JP2020-559429.

* cited by examiner

METHOD FOR DISPLAYING BATTLE INTERFACE IN TERMINAL, DEVICE, AND STORAGE MEDIUM THEREOF

RELATED APPLICATION

This application is a continuation application of PCT Patent Application No. PCT/CN2019/084716, filed on Apr. 28, 2019, which claims priority to Chinese Patent Application No. 201810618163.4, entitled "METHOD AND APPARATUS FOR DISPLAYING BATTLE INTERFACE IN TERMINAL, DEVICE, AND STORAGE MEDIUM" filed with the China National Intellectual Property Administration on Jun. 15, 2018, wherein the entirety of each of the above-referenced applications is incorporated herein by reference in its entirety.

FIELD OF THE TECHNOLOGY

This application relates to the field of Internet technologies, and in particular, to a method and an apparatus for displaying a battle interface in a terminal, a device, and a storage medium.

BACKGROUND OF THE DISCLOSURE

A tile-matching game is a casual game application program run in a terminal such as a mobile phone, a tablet computer, or a personal computer. Usually, the tile-matching game is applied to a player versus environment (PVE) scenario. In this scenario, a user in a round connects a plurality of to-be-eliminated elements of the same type to adjacent locations to eliminate the adjacent to-be-eliminated elements and get a score.

In the related art, the tile-matching game may also be applied to a player versus player (PVP) scenario. Typically, a battling method of the tile-matching game includes as follows: A first user and a second user simultaneously perform elimination after getting online. To be specific, the first user and the second user each in a respective round connect to-be-eliminated elements of the same type to adjacent locations on a respective corresponding map for elimination, and get a respective score. When the score of the first user or the second user reaches a predetermined winning condition, it is determined that the first user or the second user wins.

In the battling method, the two battle parties eliminate to-be-eliminated elements on the respective maps, and the elimination of the to-be-eliminated elements is displayed on the respective maps. After the to-be-eliminated elements are eliminated, respective battle data is synchronized to a server. Consequently, a relatively large battle display delay is caused.

SUMMARY

A terminal is provided, including: a processor, a memory, and a screen, the memory storing at least one computer-readable instruction, and the processor being configured to load and execute the at least one computer-readable instruction to implement the following operations:

displaying a battle board in a user interface (UI) of the screen, a plurality of arrayed lattices in the battle board being used for displaying respective corresponding to-be-eliminated elements and placeholder identifiers, and a placeholder identifier of at least one lattice in an initial state being a first placeholder identifier corresponding to a current account;

obtaining, in the $i^{th}$ round of n rounds, an $i^{th}$ location switching instruction used for switching locations of a first to-be-eliminated element and a second to-be-eliminated element that are adjacent, the n rounds being operation timing units in which at least two accounts alternately have operation permission, the $i^{th}$ round being a round in which the current account has operation permission, n being a natural number, i being a natural number, and $1 \leq i \leq n$;

switching the first to-be-eliminated element and the second to-be-eliminated element according to the $i^{th}$ location switching instruction;

eliminating, in a case that a preset quantity of to-be-eliminated elements of the same type are connected after the locations of the first to-be-eliminated element and the second to-be-eliminated element are switched, the connected to-be-eliminated elements;

displaying the first placeholder identifier as placeholder identifiers of lattices corresponding to the eliminated elements in a case that the eliminated elements include a to-be-eliminated element having the first placeholder identifier; and displaying a winner in the at least two accounts according to the placeholder identifiers of the lattices on the battle board and a winning condition.

A server is provided, including: a processor and a memory, the memory storing at least one computer-readable instruction, and the processor being configured to load and execute the at least one computer-readable instruction to implement the following operations:

recording board data of a battle board, the battle board including a plurality of arrayed lattices, and the board data including to-be-eliminated elements and placeholder identifiers displayed on the lattices;

receiving, in the $i^{th}$ round of n rounds, an $i^{th}$ location switching instruction transmitted by a target terminal corresponding to a target account, the $i^{th}$ location switching instruction being used for switching locations of a first to-be-eliminated element and a second to-be-eliminated element that are adjacent, the n rounds being operation timing units in which at least two accounts alternately have operation permission, the $i^{th}$ round being a round in which the target account of the at least two accounts has operation permission, n being a natural number, i being a natural number, and $1 \leq i \leq n$;

switching display locations of the first to-be-eliminated element and the second to-be-eliminated element in the board data according to the $i^{th}$ location switching instruction;

transmitting a first instruction to terminals respectively corresponding to the at least two accounts in a case that a preset quantity of to-be-eliminated elements of the same type are connected after the locations of the first to-be-eliminated element and the second to-be-eliminated element are switched, the first instruction being used for instructing to eliminate the connected eliminated elements;

transmitting a second instruction to the terminals respectively corresponding to the at least two accounts in a case that the eliminated elements include a to-be-eliminated element having a first placeholder identifier, the second instruction being used for instructing to display the first placeholder identifier as placeholder identifiers of lattices corresponding to the eliminated elements, the first placeholder identifier being a placeholder identifier corresponding to the target account; and determining a winner in the at least two accounts according to the placeholder identifiers of the lattices on the battle board and a winning condition, and transmitting a third instruction to the terminals respectively corresponding to the at least two accounts, the third instruction being used for instructing to display the winner in the at least two accounts.

A method for displaying a battle interface in a terminal is provided, performed by a terminal, the method including:

displaying a battle board in a UI of a screen, a plurality of arrayed lattices in the battle board configured to display corresponding to-be-eliminated elements and placeholder identifiers, and a placeholder identifier of at least one lattice in an initial state being a first placeholder identifier corresponding to a current account;

obtaining, in an $i^{th}$ round of n rounds, an $i^{th}$ location switching instruction used for switching locations of a first to-be-eliminated element and a second to-be-eliminated element that are adjacent, the n rounds being operation timing units during which at least two accounts alternately have operation permission, the $i^{th}$ round being a round in which the current account has operation permission, n being a natural number, i being a natural number, and $1 \leq i \leq n$;

switching the first to-be-eliminated element and the second to-be-eliminated element according to the $i^{th}$ location switching instruction;

eliminating, in a case that a predetermined quantity of to-be-eliminated elements with the same type are connected after the locations of the first to-be-eliminated element and the second to-be-eliminated element are switched, connected to-be-eliminated elements with the same type;

displaying placeholder identifiers of lattices corresponding to the eliminated elements as the first placeholder identifier in a case that the eliminated elements include an element having the first placeholder identifier; and displaying a winner among the at least two accounts according to the placeholder identifiers of the lattices on the battle board and a winning condition.

A method for displaying a battle interface in a terminal is provided, performed by a server, the method including:

recording board data of a battle board, the battle board including a plurality of arrayed lattices, and the board data including to-be-eliminated elements and placeholder identifiers displayed on the lattices;

receiving, in an $i^{th}$ round of n rounds, an $i^{th}$ location switching instruction from a target terminal corresponding to a target account, the $i^{th}$ location switching instruction comprising an instruction to switch locations of a first to-be-eliminated element and a second to-be-eliminated element that are adjacent, the n rounds being operation timing units during which at least two accounts alternately have operation permission, the at least two accounts including the target account, the $i^{th}$ round being a round in which the target account of the at least two accounts has operation permission, n being a natural number, i being a natural number, and $1 \leq i \leq n$;

switching display locations of the first to-be-eliminated element and the second to-be-eliminated element in the board data according to the $i^{th}$ location switching instruction;

transmitting a first instruction to terminals respectively corresponding to the at least two accounts in a case that a predetermined quantity of to-be-eliminated elements with the same type are connected after the locations of the first to-be-eliminated element and the second to-be-eliminated element are switched, the first instruction comprising an instruction to eliminate connected eliminated elements with the same type;

transmitting a second instruction to the terminals respectively corresponding to the at least two accounts in a case that the eliminated elements include an element having a first placeholder identifier, the second instruction comprising an instruction to display placeholder identifiers of lattices corresponding to the eliminated elements as the first placeholder identifier, the first placeholder identifier being a placeholder identifier corresponding to the target account; and determining a winner among the at least two accounts according to the placeholder identifiers of the lattices on the battle board and a winning condition, and transmitting a third instruction to the terminals respectively corresponding to the at least two accounts, the third instruction comprising an instruction to display the winner among the at least two accounts.

In an embodiment, the method further includes:

generating a sixth instruction according to first configuration information in a case that a quantity of lattices having the first placeholder identifier in the battle board reaches a second quantity threshold, the sixth instruction being used for instructing to additionally display a treasure chest element and/or an obstacle element in the battle board randomly, a random to-be-eliminated element being displayed as an updated to-be-eliminated element after the treasure chest element is eliminated, the random to-be-eliminated element including any one of the to-be-eliminated element, the impact effect element, and the obstacle element; and transmitting the sixth instruction to the terminals corresponding to the at least two accounts.

In an embodiment, a lattice having a $j^{th}$ placeholder identifier in the battle board is a lattice occupied by a $j^{th}$ account of the at least two accounts, j being a natural number, and the method further includes:

generating a seventh instruction according to second configuration information in a case that i is greater than k or a difference between quantities of lattices respectively occupied by the at least two accounts is less than a third quantity threshold, the seventh instruction being used for instructing to additionally display a lightening effect element in the battle board randomly, k being a natural number, and $1 \leq k \leq n$; and randomly determining a target lattice in lattices occupied by another account among the at least two accounts other than the target account in a case that the eliminated elements include the lightening effect element, and transmitting an eighth instruction to the terminals corresponding to the at least two accounts, the eighth instruction being used for instructing to eliminate a to-be-eliminated element in the target lattice, and display a placeholder identifier of the target lattice as the first placeholder identifier.

In an embodiment, the method further includes:

determining an account occupying the most lattices among the at least two accounts as the winner after the n rounds; or determining the target account as the winner in a case that a quantity of lattices occupied by the target account is greater than a fourth quantity threshold; or determining the target account as the winner in a case that the target account occupies all the lattices in the battle board after the $i^{th}$ round; and transmitting a ninth instruction to the terminals corresponding to the at least two accounts, the ninth instruction being used for instructing to display the winner;

a lattice having a $j^{th}$ placeholder identifier in the battle board being a lattice occupied by a $j^{th}$ account of the at least two accounts, and j being a natural number.

In an embodiment, the method further includes:

determining the target account as the winner after the $i^{th}$ round in a case that no location switching instruction is received from another account among the at least two accounts other than the target account within a first predetermined time in the first round to the $(i-1)^{th}$ round of the n rounds; or determining the target account as the winner after the $i^{th}$ round in a case that no location switching instruction is received from the another account within a second predetermined time in a predetermined quantity of rounds of the first round to the $(i-1)^{th}$ round; or determining an account executing an $n^{th}$ location switching instruction as the winner in a case that quantities of lattices occupied by all the accounts among the at least two accounts are the same after the n rounds; and transmitting a ninth instruction to the terminals corresponding to the at least two accounts, the ninth instruction being used for instructing to display the winner.

In an embodiment, before the recording board data of a battle board, the method further includes:

obtaining historical win rate grades corresponding to a plurality of accounts, and assigning the at least two accounts whose difference between historical win rate grades is less than a difference threshold to the same battle board; and transmitting a battle start signal to the at least two accounts, the battle start signal being used for instructing to perform a battle on the battle board.

In an embodiment, the obtaining historical win rate grades corresponding to a plurality of accounts, and assigning the at least two accounts whose difference between historical win rate grades is less than a difference threshold to the same battle board includes:

determining a first historical win rate grade of the target account;

performing first matching in a first account matching pool corresponding to the first historical win rate grade;

performing second matching in a second account matching pool corresponding to a second historical win rate grade in a case that the first matching fails, the second historical win rate grade being one grade higher than the first historical win rate grade;

performing third matching in a third account matching pool corresponding to a third historical win rate grade in a case that the second matching fails, the third historical win rate grade being one grade lower than the second historical win rate grade; and assigning, in a case that the first matching, the second matching, or the third matching succeeds, the at least two accounts matched successfully to the same battle board.

In an embodiment, the method further includes:

randomly determining the battle board from a board library corresponding to the first historical win rate grade of the target account.

In an embodiment, the method further includes:

randomly determining placeholder identifiers of the lattices in an initial state in the battle board, a placeholder identifier corresponding to each of the at least two accounts being corresponding to at least one lattice.

An apparatus for displaying a battle interface is provided, including:

a display module, configured to display a battle board in a UI of a screen, a plurality of arrayed lattices in the battle board being used for displaying respective corresponding to-be-eliminated elements and placeholder identifiers, and a placeholder identifier of at least one lattice in an initial state being a first placeholder identifier corresponding to a current account;

an obtaining module, configured to obtain, in the $i^{th}$ round of n rounds, an $i^{th}$ location switching instruction used for switching locations of a first to-be-eliminated element and a second to-be-eliminated element that are adjacent, the n rounds being operation timing units in which at least two accounts alternately have operation permission, the $i^{th}$ round being a round in which the current account has operation permission, n being a natural number, i being a natural number, and $1 \le i \le n$; and a processing module, configured to switch the first to-be-eliminated element and the second to-be-eliminated element according to the $i^{th}$ location switching instruction; and eliminate, in a case that a predetermined quantity of to-be-eliminated elements of the same type are connected after the locations of the first to-be-eliminated element and the second to-be-eliminated element are switched, the connected to-be-eliminated elements;

the display module being further configured to display placeholder identifiers of lattices corresponding to the eliminated elements as the first placeholder identifier in a case that the eliminated elements include a to-be-eliminated element having the first placeholder identifier; and display a winner among the at least two accounts according to the placeholder identifiers of the lattices on the battle board and a winning condition.

An apparatus for displaying a battle interface is provided, including:

a processing module, configured to record board data of a battle board, the battle board including a plurality of arrayed lattices, and the board data including to-be-eliminated elements and placeholder identifiers displayed on the lattices;

a receiving module, configured to receive, in the $i^{th}$ round of n rounds, an $i^{th}$ location switching instruction transmitted by a target terminal corresponding to a target account, the $i^{th}$ location switching instruction being used for switching locations of a first to-be-eliminated element and a second to-be-eliminated element that are adjacent, the n rounds being operation timing units in which at least two accounts alternately have operation permission, the $i^{th}$ round being a round in which the target account of the at least two accounts has operation permission, n being a natural number, i being a natural number, and $1 \le i \le n$;

the processing module being further configured to switch display locations of the first to-be-eliminated element and the second to-be-eliminated element in the board data according to the $i^{th}$ location switching instruction; and a transmitting module, configured to transmit a first instruction to terminals respectively corresponding to the at least two accounts in a case that a predetermined quantity of to-be-eliminated elements of the same type are connected after the locations of the first to-be-eliminated element and the second to-be-eliminated element are switched, the first instruction being used for instructing to eliminate the connected eliminated elements; transmit a second instruction to the terminals respectively corresponding to the at least two accounts in a case that the eliminated elements include a to-be-eliminated element having a first placeholder identifier, the second instruction being used for instructing to display placeholder identifiers of lattices corresponding to the eliminated elements as the first placeholder identifier, the first placeholder identifier being a placeholder identifier corresponding to the target account; and determine a winner among the at least two accounts according to the placeholder identifiers of the lattices on the battle board and a winning condition, and transmit a third instruction to the terminals respectively corresponding to the at least two accounts, the third instruction being used for instructing to display the winner among the at least two accounts.

A non-volatile computer-readable storage medium is provided, storing a computer-readable instruction, the computer-readable instruction, when executed by one or more processors, causing the one or more processors to perform the following operations:

displaying a battle board in a UI of a screen, a plurality of arrayed lattices in the battle board configured to display corresponding to-be-eliminated elements and placeholder identifiers, and a placeholder identifier of at least one lattice in an initial state being a first placeholder identifier corresponding to a current account;

obtaining, in an $i^{th}$ round of n rounds, an $i^{th}$ location switching instruction used for switching locations of a first to-be-eliminated element and a second to-be-eliminated element that are adjacent, the n rounds being operation timing units in which at least two accounts alternately have operation permission, the $i^{th}$ round being a round in which the current account has operation permission, n being a natural number, i being a natural number, and $1 \leq i \leq n$;

switching the first to-be-eliminated element and the second to-be-eliminated element according to the $i^{th}$ location switching instruction;

eliminating, in a case that a predetermined quantity of to-be-eliminated elements with the same type are connected after the locations of the first to-be-eliminated element and the second to-be-eliminated element are switched, connected to-be-eliminated elements with the same type;

displaying placeholder identifiers of lattices corresponding to the eliminated elements as the first placeholder identifier in a case that the eliminated elements include an element having the first placeholder identifier; and displaying a winner among the at least two accounts according to the placeholder identifiers of the lattices on the battle board and a winning condition.

A non-volatile computer-readable storage medium is provided, storing a computer-readable instruction, the computer-readable instruction, when executed by one or more processors, causing the one or more processors to perform the following operations:

recording board data of a battle board, the battle board including a plurality of arrayed lattices, and the board data including to-be-eliminated elements and placeholder identifiers displayed on the lattices;

receiving, in the $i^{th}$ round of n rounds, an $i^{th}$ location switching instruction transmitted by a target terminal corresponding to a target account, the $i^{th}$ location switching instruction being used for switching locations of a first to-be-eliminated element and a second to-be-eliminated element that are adjacent, the n rounds being operation timing units in which at least two accounts alternately have operation permission, the $i^{th}$ round being a round in which the target account of the at least two accounts has operation permission, n being a natural number, i being a natural number, and $1 \leq i \leq n$;

switching display locations of the first to-be-eliminated element and the second to-be-eliminated element in the board data according to the $i^{th}$ location switching instruction;

transmitting a first instruction to terminals respectively corresponding to the at least two accounts in a case that a predetermined quantity of to-be-eliminated elements of the same type are connected after the locations of the first to-be-eliminated element and the second to-be-eliminated element are switched, the first instruction being used for instructing to eliminate the connected eliminated elements;

transmitting a second instruction to the terminals respectively corresponding to the at least two accounts in a case that the eliminated elements include a to-be-eliminated element having a first placeholder identifier, the second instruction being used for instructing to display placeholder identifiers of lattices corresponding to the eliminated elements as the first placeholder identifier, the first placeholder identifier being a placeholder identifier corresponding to the target account; and determining a winner among the at least two accounts according to the placeholder identifiers of the lattices on the battle board and a winning condition, and transmitting a third instruction to the terminals respectively corresponding to the at least two accounts, the third instruction being used for instructing to display the winner among the at least two accounts.

BRIEF DESCRIPTION OF THE DRAWINGS

The following briefly describes the accompanying drawings required for describing the embodiments. Apparently, the accompanying drawings in the following descriptions show merely some embodiments of this application, and a person of ordinary skill in the art may still derive other drawings from these accompanying drawings without creative efforts.

DESCRIPTION OF EMBODIMENTS

Figure 1:
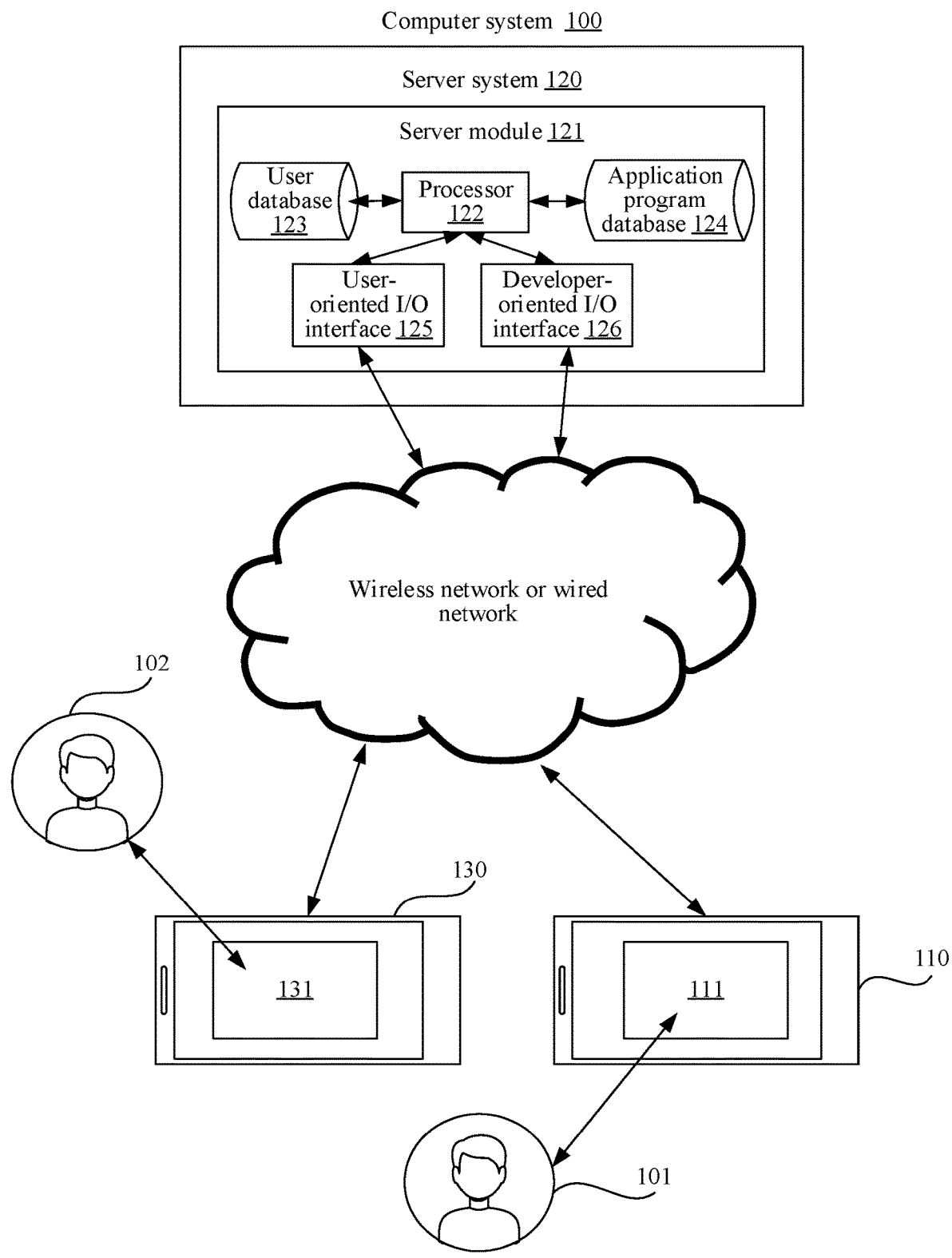
FIG. 1 is a structural block diagram of a computer system according to an exemplary embodiment of this application.

The following clearly and completely describes the technical solutions in the embodiments of this application with reference to the accompanying drawings in the embodiments of this application. Apparently, the described embodiments are some of the embodiments of this application rather than all of the embodiments. All other embodiments obtained by persons of ordinary skill in the art based on the embodiments of the present invention without making creative efforts shall fall within the protection scope of the present invention.

The following describes some terms involved in the embodiments of this application.

A battle board is a map used by at least two accounts battling in a PVP-type tile-matching game. The map includes a plurality of arrayed lattices. Each lattice is used for displaying a to-be-eliminated element. In the tile-matching game, a location of each lattice remains unchanged. Optionally, a shape of the battle board is at least one of a square, a rectangular, a rhombus, and an irregular shape. A shape of the lattice in the battle board is a square, a hexagon, or another shape meeting array repetition. Specific shapes of the battle board and the lattice are not limited in this application.

A to-be-eliminated element is an image element displayed on a lattice of the battle board. The lattice is in a one-to-one correspondence with the to-be-eliminated element. Locations of to-be-eliminated elements in two adjacent lattices may be switched according to a user operation. To-be-eliminated elements displayed on the battle board include at least two different types of to-be-eliminated elements. The types of the to-be-eliminated elements are obtained through classification according to at least one attribute of color, shape, brightness, icon, and text. To-be-eliminated elements are eliminated from lattices when meeting an elimination condition. A basic elimination condition includes as follows: When at least three adjacent to-be-eliminated elements of the same type are present in the same direction (or the same column), the at least adjacent to-be-eliminated elements of the same type are eliminated. For example, the to-be-eliminated elements are classified according to colors. When at least three adjacent red to-be-eliminated elements are present in the same row or column, the at least three red to-be-eliminated elements are eliminated. Optionally, updated to-be-eliminated elements are displayed after the to-be-eliminated elements on the lattices are eliminated. The updated to-be-eliminated elements may be the same as or different from the eliminated elements. In some tile-matching games, the updated to-be-eliminated elements are directly added to the lattices. In some other tile-matching games, the updated to-be-eliminated elements are added in an animation form of falling on the lattices from outside of the board. In some other tile-matching games, the updated to-be-eliminated elements are added to the lattices in a form that all to-be-eliminated elements above the eliminated elements fall down one lattice location.

A round is an operation timing unit in which a single user account of at least two user accounts battling on the same battle board has operation permission. Usually, one round allows only one user account to have operation permission. The operation permission includes operation permission of switching board locations of two adjacent to-be-eliminated elements on the battle board. Optionally, a total quantity of rounds in one battle is predetermined to a fixed value. For example, when a user account 1 and a user account 2 perform an elimination battle on the same battle board, the user account 1 has operation permission in odd rounds, and a user account 2 has operation permission in even rounds. For another example, when a user account 1, a user account 2, and a user account 3 perform an elimination battle on the same battle board, according to a random assignment rule, the user account 2 operates in the first round, the user account 3 operates in the second round, and the user account 1 operates in the third round; the user account 2 operates in the fourth round, the user account 3 operates in the fifth round, and the user account 1 operates in the sixth round; and so on, until the last round ends.

A placeholder identifier is an identifier displayed on a lattice and used for identifying whom the lattice belongs to, that is, identifying a user account to which the lattice belongs. The placeholder identifier is represented in at least one form of a lattice background color, a board background texture, a lattice rim, a lattice shape, and a lattice background icon. For example, a lattice in a background color of red belongs to a user account 1, a lattice in a background color of green belongs to a user account 2, and a lattice in a background color of yellow belongs to a user account 3. For another example, a lattice with a red lattice rim belongs to a user account 1, and a lattice with a green lattice rim belongs to a user account 2. A specific form of the placeholder identifier is not limited in the embodiments of this application. After a user account eliminates at least three adjacent to-be-eliminated elements of the same type, if lattices corresponding to the eliminated elements include a placeholder identifier corresponding to the user account, all lattices corresponding to the eliminated elements display the placeholder identifier corresponding to the user account, to indicate that all the lattices are occupied by the user account.

An impact effect element is an image element that is displayed on a lattice of the battle board and has a first special effect. The impact effect element has a corresponding impact range and impact direction. The first special effect means that when the impact effect element is eliminated, a to-be-eliminated element within the impact range in the impact direction is also eliminated, and a lattice corresponding to the eliminated element is used as a lattice occupied by a user account in a current round. The impact direction is a direction obtained through classification according to a lattice arrangement direction. When the battle board is a horizontally and vertically divided board, one row of lattices belongs to one impact direction, and one column of lattices belongs to another impact direction. When the battle board is a board divided according to a hexagon, one row of lattices from left to right belongs to one impact direction, one row of lattices from upper left to lower right belongs to another impact direction, and one row of lattices from upper right to lower left belongs to another impact direction.

An obstacle element is an image element that is displayed on a lattice of the battle board and cannot be moved or eliminated.

A lightening effect element is an image element that is displayed on a lattice of the battle board and has a second special effect. The second special effect means that when the lightening effect element is eliminated, a to-be-eliminated element in a target lattice occupied by another account other than a current account is additionally eliminated, and the target lattice is set to a lattice occupied by the current account. The target lattice is randomly determined in lattices occupied by the another account. Optionally, the lightening effect element is a to-be-eliminated element presented in the last several rounds of all rounds of a battle.

An addition effect element is an image element that is displayed on a lattice of the battle board and has a third special effect. The third special effect means that after the addition effect element is eliminated, at least one additional switching operation is permitted to eliminate to-be-eliminated elements meeting the elimination condition.

A treasure chest element is an image element that is displayed on a lattice of the battle board and has a fourth special effect. The fourth special effect means that after the treasure chest element is eliminated, a new to-be-eliminated element is randomly presented on a lattice corresponding to the treasure chest element. The new to-be-eliminated element may be of any one of a plurality of types. For example, the new to-be-eliminated element is any one of a common to-be-eliminated element, an impact effect element, a lightening effect element, an addition effect element, and an obstacle element. Optionally, the treasure chest element is a to-be-eliminated element randomly added to a battle map when a quantity of lattices occupied by any user account in a battle reaches a predetermined quantity threshold or a predetermined proportion. An elimination type corresponding to the treasure chest element may be any type among common to-be-eliminated elements. For example, when the common to-be-eliminated elements are to-be-eliminated elements of a color-based classification type, the treasure chest element may be an element of any type in a red treasure chest element, a green treasure chest element, and a black treasure chest element.

FIG. 1 is a structural block diagram of a computer system according to an exemplary embodiment of this application. The computer system 100 includes: a first terminal 110, a server system 120, and a second terminal 130.

An application program supporting a tile-matching game function is installed and run in the first terminal 110. When the first terminal 110 runs the application program, a screen of the first terminal 110 displays a UI 111 of the application program, and the UI 111 displays a battle board and to-be-eliminated elements. Optionally, the first terminal 110 is a terminal used by a first user 101, and the first user 101 uses the first terminal 110 to eliminate to-be-eliminated elements on the battle board by using a first account and occupy lattices on which the eliminated elements are located. The lattices occupied by the first account display a first placeholder identifier.

The first terminal 110 is connected to the server system 120 through a wireless network or a wired network.

The server system 120 includes at least one of one or more servers, a cloud computing platform, and a virtualization center. The server system 120 is configured to provide a backend service for an online battle on the same battle board between at least two application programs supporting the tile-matching game function. Optionally, the server system 120 performs primary calculation, and the first terminal 110 and the second terminal 130 perform secondary calculation. Alternatively, the server system 120 performs secondary calculation, and the first terminal 110 and the second terminal 130 perform primary calculation. Alternatively, the server system 120, the first terminal 110, and the second terminal 130 perform coordinated calculation by using a distributed calculation architecture.

An application program supporting the tile-matching game function is installed and run in the second terminal 130. When the second terminal 130 runs the application program, a screen of the second terminal 130 displays a UI 131 of the application program, and the UI 131 displays the battle board and the to-be-eliminated elements. The second terminal 130 is a terminal used by a second user 102, and the second user 102 uses the second terminal 130 to eliminate to-be-eliminated elements on the battle board by using a second account and occupy lattices on which the eliminated elements are located. The lattices occupied by the second account display a second placeholder identifier.

Optionally, the application programs installed in the first terminal 110 and the second terminal 130 are the same. Alternatively, the application programs installed in the two terminals are application programs of the same type on different operating system platforms, the operating system platform being at least one of an Android operating system, an iOS operating system, and a Windows operating system. The first terminal 110 may refer to one of a plurality of terminals in general, and the second terminal 130 may refer to one of a plurality of terminals in general. In this embodiment, only the first terminal 110 and the second terminal 130 are used as an example for description. The first terminal 110 and the second terminal 130 are of the same or different device types. The device type includes at least one of a smartphone, a tablet computer, an e-book reader, a Moving Picture Experts Group Audio Layer III (MP3) player, a Moving Picture Experts Group Audio Layer IV (MP4) player, a laptop, and a desktop computer. The following embodiments are described by using an example that the terminal includes a smartphone.

Optionally, the first terminal 110 and the second terminal 130 get online at the same time by using the server system 120, and perform a PVP battle of a tile-matching game on the same battle board. Optionally, when at least three user accounts play the tile-matching game on the same battle board, the first terminal 110 and the second terminal 130 are any two of at least three terminals in a tile-matching game battle.

Figure 2:
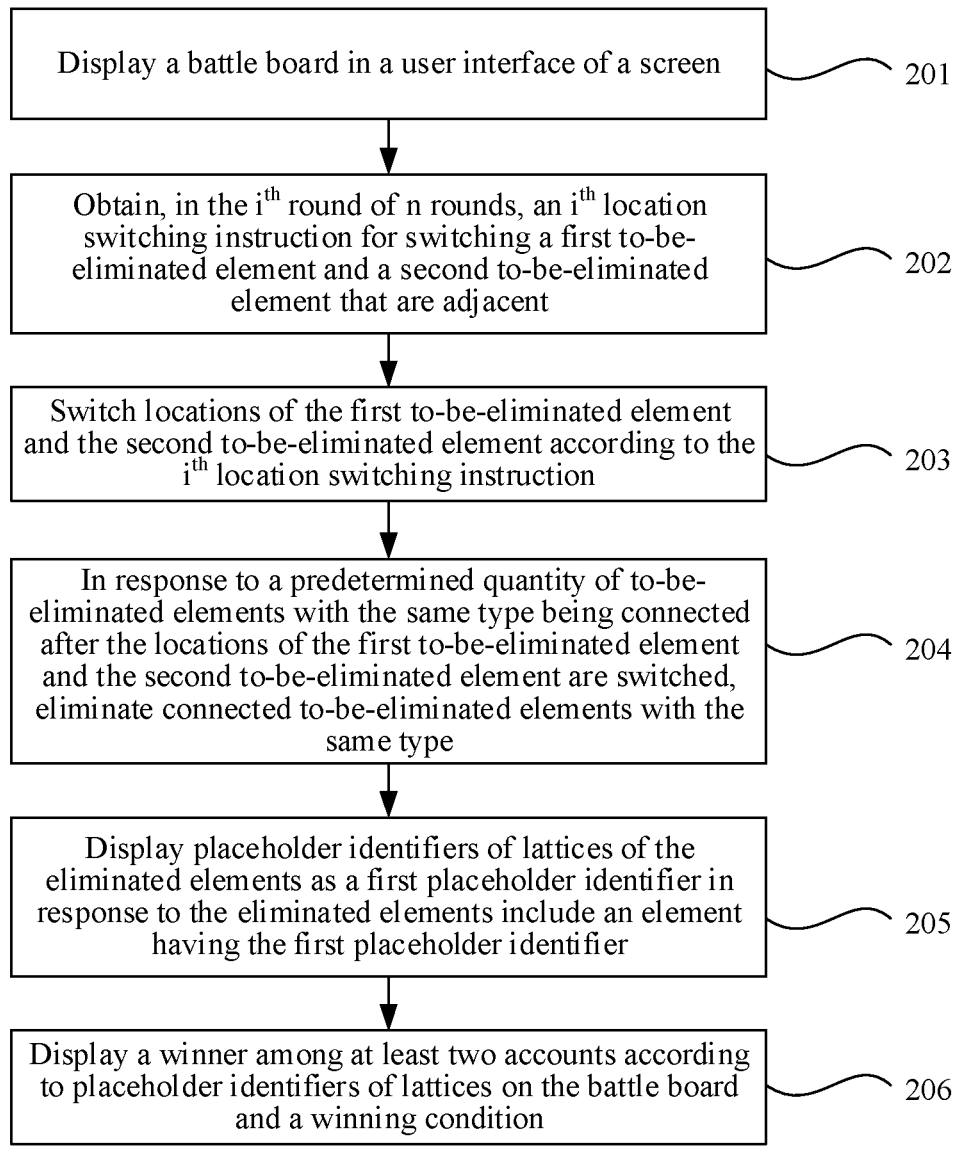
FIG. 2 is a flowchart of a method for displaying a battle interface in a terminal according to an exemplary embodiment of this application.

FIG. 2 is a flowchart of a method for displaying a battle interface in a terminal according to an exemplary embodiment of this application. This embodiment is described by using an example that the method is applied to the first terminal 110 in FIG. 1. The method includes the following steps:

Step 201. Display a battle board in a UI of a screen.

Figure 3:
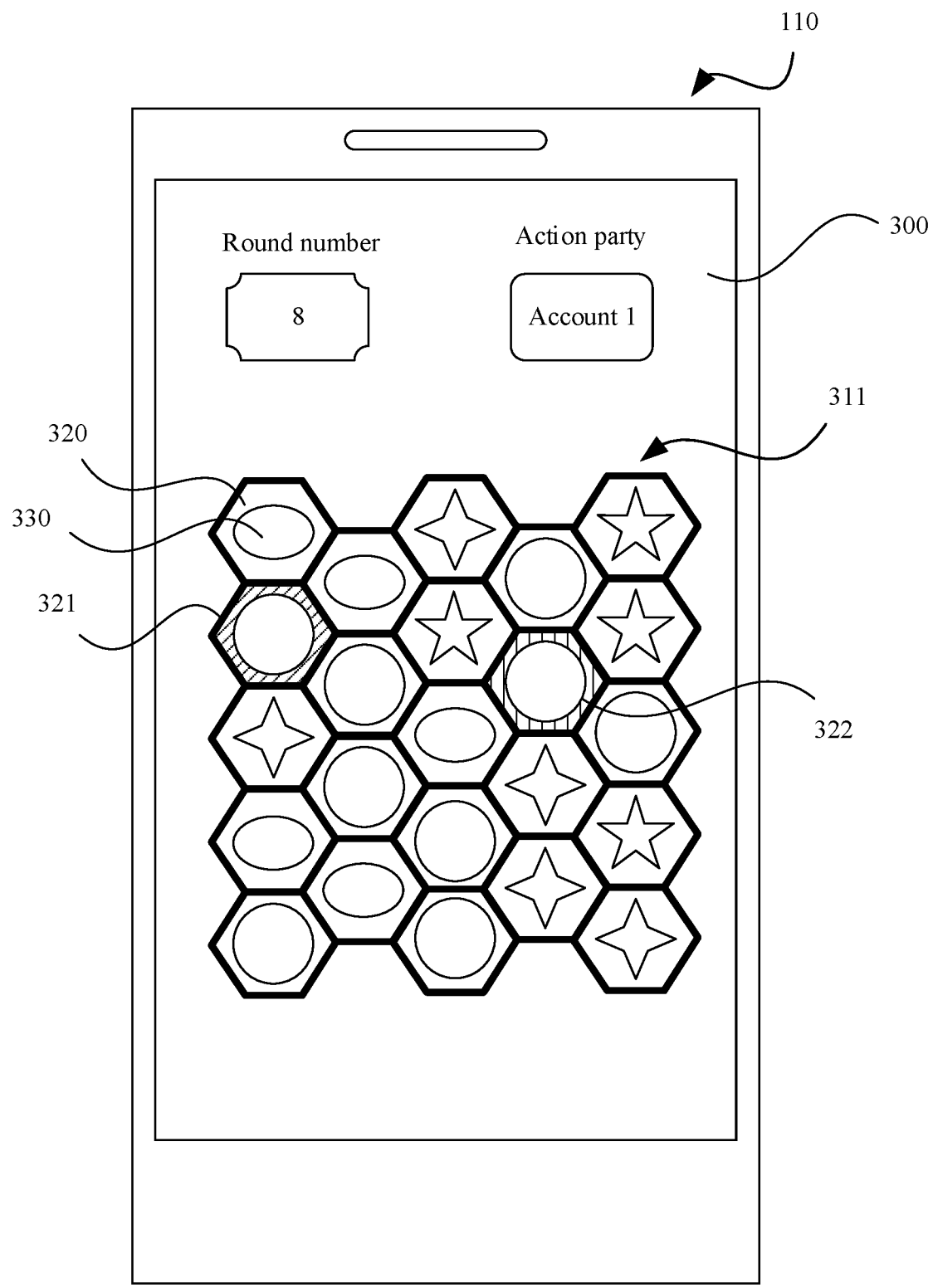
FIG. 3 is a schematic diagram of a battle board according to an exemplary embodiment of this application.

For example, as shown in FIG. 3, the terminal displays a UI 300 on a screen, and the UI 300 displays a battle board 311. The battle board 311 includes a plurality of arrayed lattices 320, and each lattice 320 displays a respective corresponding to-be-eliminated element 330. Optionally, each lattice 320 further displays a respective corresponding placeholder identifier. The placeholder identifier is used for indicating that the lattice 320 is occupied by a user account, or indicating that the lattice 320 has not been occupied by any user account.

The battle board 311 includes a first lattice 321, the first lattice 321 has a first placeholder identifier corresponding to a first account (referred to as a current account hereinafter) corresponding to the first terminal, and the first placeholder identifier is displayed on the first lattice 321 in a form of being displayed in red (which is represented by oblique lines in FIG. 3). The battle board 311 also includes a second lattice 322, the second lattice 322 has a second placeholder identifier corresponding to a second account (referred to as another account hereinafter), and the second placeholder identifier is displayed on the second lattice 322 is displayed in a form of being displayed in green (which is represented by vertical lines in FIG. 3). The first lattice 321 displaying the first placeholder identifier is a lattice occupied by the current account. In an initial state of a battle, each user account occupies at least one lattice. Optionally, a location of a lattice occupied by each user account in the initial state is randomly determined, and all the user accounts occupy the same quantity of lattices in the initial state. Optionally, the placeholder identifier is represented by using at least one form of a lattice background color, a board background texture, a lattice rim, a lattice shape, and a lattice background icon.

The to-be-eliminated element 330 has different types. The type may be at least one of a color, a shape, an identifier, and a texture of the to-be-eliminated element. For example, in FIG. 3, to-be-eliminated elements are in the same color, elliptic to-be-eliminated elements are to-be-eliminated elements of the same type, circular to-be-eliminated elements are to-be-eliminated elements of the same type, to-be-eliminated elements in a four-pointed star shape are to-be-eliminated elements of the same type, and to-be-eliminated elements in a five-pointed star shape are to-be-eliminated elements of the same type. For more distinguishing in display, to-be-eliminated elements in different shapes may be displayed in different colors. For example, the elliptic to-be-eliminated elements may be displayed in red, and the circular to-be-eliminated elements may be displayed in yellow.

Step 202. Obtain, in the $i^{th}$ round of n rounds, an $i^{th}$ location switching instruction used for switching locations of a first to-be-eliminated element and a second to-be-eliminated element that are adjacent.

For example, the terminal obtains the $i^{th}$ location switching instruction in the $i^{th}$ round of the n rounds. Optionally, a location switching instruction is an instruction triggered by at least one operation of a slide touch on the terminal, a physical handle manipulation, and a mouse slide to instruct to switch two adjacent to-be-eliminated elements.

The $i^{th}$ location switching instruction is an instruction triggered by an operation on the terminal in the $i^{th}$ round and generated to instruct to switch the first to-be-eliminated element and the second to-be-eliminated element that are adjacent. In an application program supporting a tile-matching game function, n operation permission units obtained through division according to a time sequence are predetermined. One operation permission unit is one round, each round consumes a time period, all the rounds consume equal or unequal time periods, n and i are natural numbers, and $1 \leq i \leq n$.

Step 203. Switch the locations of the first to-be-eliminated element and the second to-be-eliminated element according to the $i^{th}$ location switching instruction.

The terminal switches the locations of the first to-be-eliminated element and the second to-be-eliminated element according to the $i^{th}$ location switching instruction, that is, displays the first to-be-eliminated element on a lattice on which the second to-be-eliminated element is located before the switching, and displays the second to-be-eliminated element on a lattice on which the first to-be-eliminated element is located before the switching.

Step 204. Eliminate, in a case that a predetermined quantity of to-be-eliminated elements of the same type are connected after the locations of the first to-be-eliminated element and the second to-be-eliminated element are switched, the connected to-be-eliminated elements.

Optionally, after the locations of the first to-be-eliminated element and the second to-be-eliminated element are switched, if at least three to-be-eliminated elements of the same type are connected or adjacent in the same direction (or the same row or column) on the battle board, the at least three connected to-be-eliminated elements of the same type are eliminated.

Step 205. Display a first placeholder identifier as placeholder identifiers of lattices corresponding to the eliminated elements in a case that the eliminated elements include a to-be-eliminated element having the first placeholder identifier.

Figure 4:
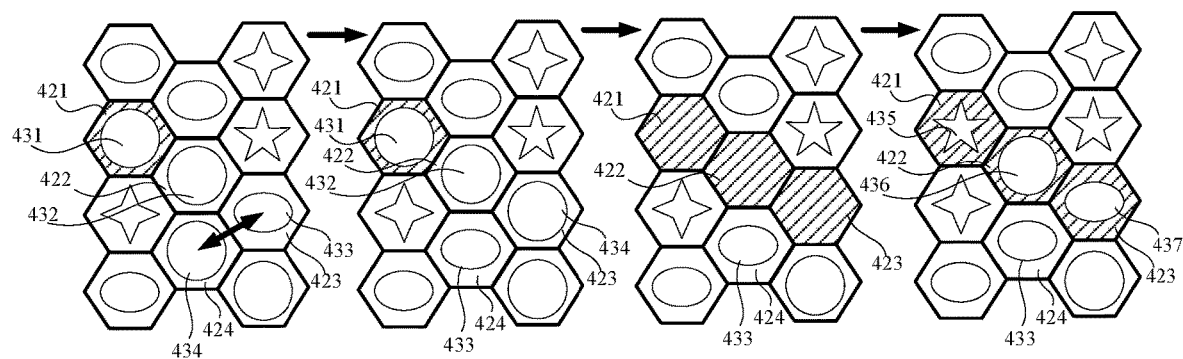
FIG. 4 is a schematic diagram of eliminating to-be-eliminated elements according to an exemplary embodiment of this application.

For example, as shown in FIG. 4, a lattice 421 displays a to-be-eliminated element 431, a lattice 422 displays a to-be-eliminated element 432, a lattice 423 displays a to-be-eliminated element 433, and a lattice 424 displays a to-be-eliminated element 434. The to-be-eliminated elements 431, 432, and 434 are all circular image elements, which are to-be-eliminated elements of the same type. The to-be-eliminated element 433 is an elliptic image element, which does not belong to the same type as the to-be-eliminated elements 431, 432, and 434. The lattice 421 displays a red first placeholder identifier.

After the terminal switches the to-be-eliminated element 433 and the to-be-eliminated element 434 according to the $i^{th}$ location switching instruction between locations indicated by arrow directions, the to-be-eliminated element 433 is displayed on the lattice 424 corresponding to the to-be-eliminated element 434 before the $i^{th}$ location switching instruction is received, and the to-be-eliminated element 434 is displayed on the lattice 423 corresponding to the to-be-eliminated element 433 before the $i^{th}$ location switching instruction is received. Therefore, the three to-be-eliminated elements 431, 432, and 434 of the same type are connected in the same direction, and the terminal eliminates the to-be-eliminated elements 431, 432, and 434. Because the lattice 421 has the red first placeholder identifier, after the terminal eliminates the to-be-eliminated elements 431, 432, and 434, the lattices 422 and 423 display the red first placeholder identifier. Visually, the first placeholder identifier "spreads" from the lattice 421 to the lattices 422 and 423. Optionally, after the terminal eliminates the to-be-eliminated elements 431, 432, and 434, the lattices 422, 423, and 424 are updated to display to-be-eliminated elements 435, 436, and 437.

Figure 5:
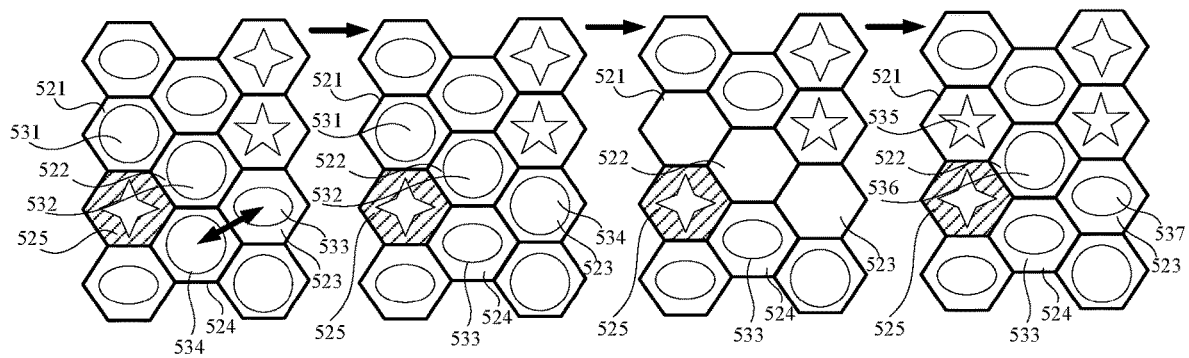
FIG. 5 is a schematic diagram of eliminating to-be-eliminated elements according to an exemplary embodiment of this application.

For example, as shown in FIG. 5, a lattice 521 displays a to-be-eliminated element 531, a lattice 522 displays a to-be-eliminated element 532, a lattice 523 displays a to-be-eliminated element 533, and a lattice 524 displays a to-be-eliminated element 534. The to-be-eliminated elements 531, 532, and 534 are all circular image elements, which are to-be-eliminated elements of the same type. The to-be-eliminated element 533 is an elliptic image element, which does not belong to the same type as the to-be-eliminated elements 531, 532, and 534. The lattice 525 displays a red first placeholder identifier.

After the terminal switches the to-be-eliminated element 533 and the to-be-eliminated element 534 according to the $i^{th}$ location switching instruction between locations indicated by arrow directions, the to-be-eliminated element 533 is displayed on the lattice 524 corresponding to the to-be-eliminated element 534 before the $i^{th}$ location switching instruction is received, and the to-be-eliminated element 534 is displayed on the lattice 523 corresponding to the to-be-eliminated element 533 before the $i^{th}$ location switching instruction is received. Therefore, the three to-be-eliminated elements 531, 532, and 534 of the same type are connected. If a predetermined quantity is 3, the terminal eliminates the to-be-eliminated elements 531, 532, and 534. Because none of the lattices 521, 522, and 523 of the to-be-eliminated elements 531, 532, and 534 has a placeholder identifier, after the terminal eliminates the to-be-eliminated elements 531, 532, and 534, no placeholder identifier is displayed on the lattice 521, 522, 523. Visually, the first placeholder identifier does not "spread". Optionally, after the terminal eliminates the to-be-eliminated elements 531, 532, and 534, the lattices 522, 523, and 524 are updated to display to-be-eliminated elements 535, 536, and 537.

Step 206. Display a winner in at least two accounts according to placeholder identifiers of lattices on the battle board and a winning condition.

The terminal counts, according to the placeholder identifiers of the lattices on the battle board, a quantity of lattices occupied by each account, and displays the winner in at least two accounts in the UI when the winning condition is met. The winning condition may be at least one of the following conditions:

After the n rounds, the terminal determines an account occupying the most lattices as the winner, and displays, in the UI, information showing that the account is the winner.

In the $i^{th}$ round, when a quantity of lattices occupied by the current account exceeds a fourth quantity threshold, the terminal determines the current account as the winner, and displays, in the UI, information showing that the current account is the winner.

In the $i^{th}$ round, when the current account occupies all the lattices on the battle board, the terminal determines the current account as the winner, and displays, in the UI, information showing that the current account is the winner.

After the n rounds, if quantities of lattices occupied by all the accounts among the at least two accounts are the same, the terminal determines an account corresponding to the $n^{th}$ round as the winner, and displays, in the UI, information showing that the account is the winner.

After the $i^{th}$ round, if no location switching instruction is received from another account within a first predetermined time, the terminal determines the current account as the winner, and displays, in the UI, information showing that the current account is the winner. For example, in a battle of two accounts, to-be-eliminated elements are eliminated according to an $i^{th}$ switching signal received from the current account and/or lattices are occupied in the $i^{th}$ round. Then, in the $(i+1)^{th}$ round, if an $(i+1)^{th}$ location switching instruction is not received from the opposite account within a first predetermined time of 30 seconds, it is determined that the current account is the winner.

After the $i^{th}$ round, if no location switching instruction is received from another account within a second predetermined time in a predetermined quantity of rounds, the terminal determines the current account as the winner, and displays, in the UI, information showing that the current account is the winner. For example, in a battle of two accounts, to-be-eliminated elements are eliminated according to an $i^{th}$ switching signal received from the current account and/or lattices are occupied in the $i^{th}$ round. Then, in the $(i+1)^{th}$ round, an $(i+1)^{th}$ location switching instruction is not received from the opposite account within a second predetermined time of 10 seconds. If there are two of previous rounds in which no location switching instruction is received from the opposite account within 10 seconds, as the opposite account accumulatively fails to operate within 10 seconds three times, it is determined that the current account is the winner if a predetermined times threshold is 3.

Based on the above, in this embodiment of this application, location switching instructions of at least two terminals in respective rounds on the same battle board are received, and elimination operations performed on to-be-eliminated elements on the battle board and/or effects of occupying lattices on the battle board by accounts corresponding to the at least two terminals are synchronously displayed on the battle board in real time, which resolves a problem of a relatively large synchronization delay caused as two battle parties eliminate to-be-eliminated elements on respective maps and the elimination of the to-be-eliminated elements is displayed on the respective maps in the related art. Because operations of all the accounts in respective rounds are synchronously displayed on the same battle map, a battle synchronization delay is reduced.

Figure 6:
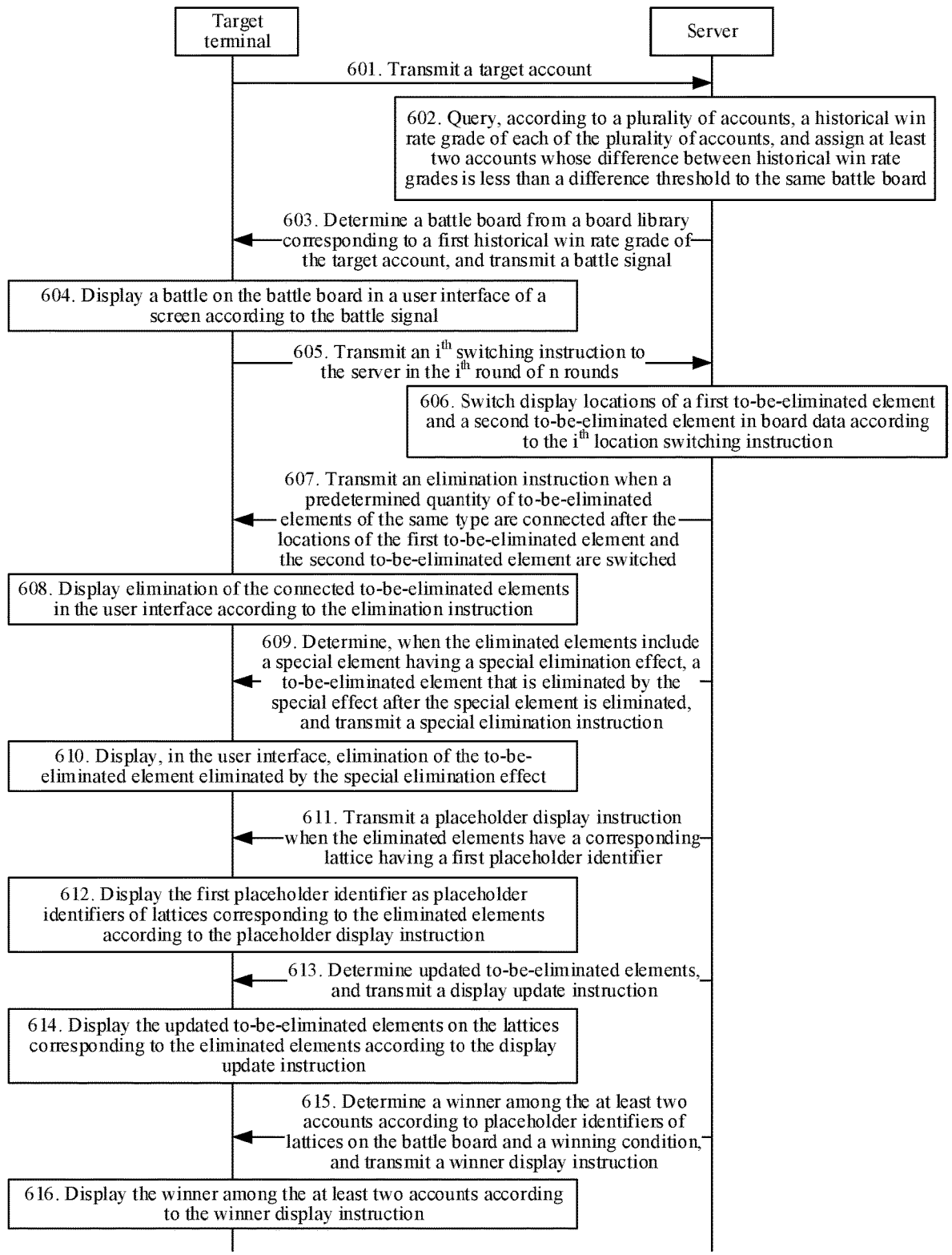
FIG. 6 is a flowchart of a method for displaying a battle interface in a terminal according to an exemplary embodiment of this application.

FIG. 6 is a flowchart of a method for displaying a battle interface in a terminal according to an exemplary embodiment of this application. This embodiment is described by using an example that the method is applied to the computer system 100 in FIG. 1. The method includes the following steps:

Step 601. Terminals corresponding to a plurality of accounts transmit the respective accounts to a server.

In FIG. 6, the terminals corresponding to the plurality of accounts are described by using an example that the first terminal 110 is a target terminal.

The terminals corresponding to the plurality of accounts transmit the respective accounts to the server when running an application program having a tile-matching game function.

Step 602. The server obtains historical win rate grades of the plurality of accounts, and assigns at least two accounts whose difference between historical win rate grades is less than a difference threshold to the same battle board.

The server queries a database of the application program for historical win times and/or historical win rates of the plurality of accounts, obtains a historical win rate grade of each account through calculation according to historical win times and/or a historical win rate of each account by using a predetermined algorithm, obtains a difference between historical win rate grades of every two of the plurality of accounts through subtraction, and assigns at least two accounts whose difference between historical win rate grades is less than the difference threshold to the same battle board. The at least two accounts include the target account.

Optionally, the server performs first matching in a first account matching pool corresponding to a first historical win rate grade corresponding to the target account; performs second matching in a second account matching pool corresponding to a second historical win rate grade in a case that the first matching fails, the second historical win rate grade being one grade higher than the first historical win rate grade; performs third matching in a third account matching pool corresponding to a third historical win rate grade in a case that the second matching fails, the third historical win rate grade being one grade lower than the second historical win rate grade; and assigns, in a case that the first matching, the second matching, or the third matching succeeds, the at least two accounts matched successfully to the same battle board.

The target account may fail to be matched with another account, whose difference between historical win rate grades is less than the difference threshold. Therefore, after determining the first historical win rate grade corresponding to the target account, the server first performs matching for the target account in the first account matching pool including accounts corresponding to the first historical win rate grade; if no account in the first account matching pool can be matched with the target account, performs matching for the target account in the second account matching pool including accounts corresponding to the second historical win rate grade, the second historical win rate grade being higher than the first historical win rate grade; and if no account in the second account matching pool can be matched with the target account, performs matching for the target account in the third account matching pool including accounts corresponding to the third historical win rate grade, the third historical win rate grade being lower than the first historical win rate grade.

For example, the historical win rate grade corresponding to the target account is a bronze I grade. If no corresponding account can be matched in a first matching pool of the bronze I grade, matching is performed in a second matching pool of a silver III grade that is one grade higher than the bronze I grade, and if no corresponding account can be matched in the second matching pool, matching is performed in a matching pool of a bronze II grade that is one grade lower than the bronze I grade.

Step 603. The server randomly determines a battle board from a board library corresponding to a first historical win rate grade of a target account, and transmits a battle signal to terminals respectively corresponding to the at least two accounts.

For example, the server stores a correspondence between a historical win rate grade and a board library. For example, the historical win rate grade may be classified as beginner, intermediate, or advanced, each grade has a corresponding quantity and type of battle maps conforming to the grade, and a beginner account corresponds to less and easier maps than intermediate and advanced accounts.

The server queries the correspondence according to the first historical win rate grade of the target account and obtains at least one battle board corresponding to the target account, randomly selects a battle board from the at least one battle board as the battle board of the at least two accounts, and then transmits the battle signal to the terminals respectively corresponding to the at least two accounts.

Step 604. The target terminal displays a battle on the battle board in a UI of a screen according to the battle signal.

Figure 7:
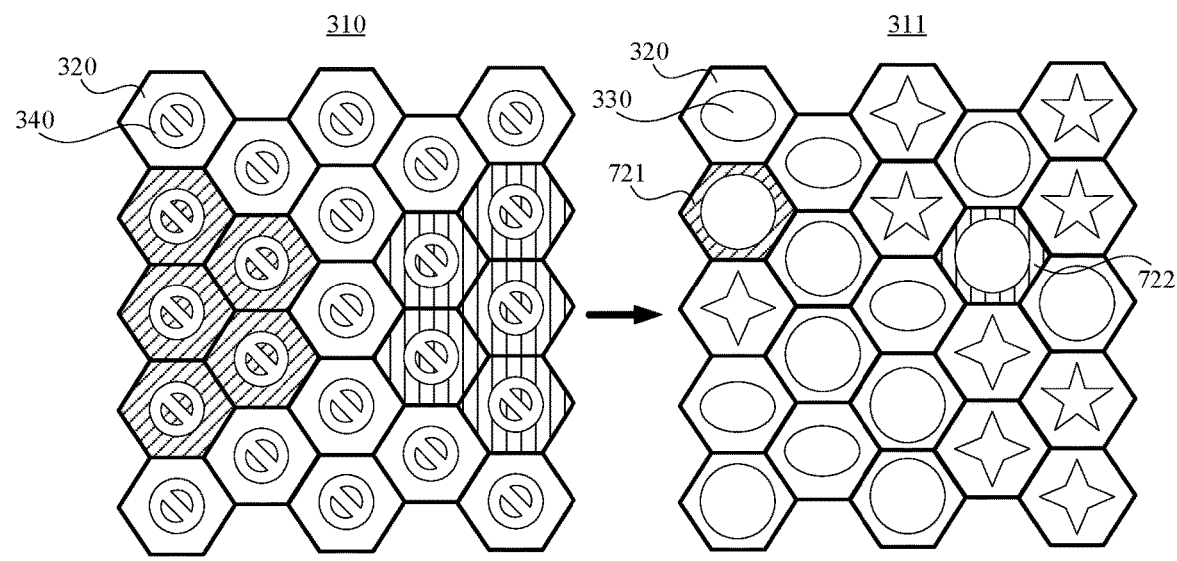
FIG. 7 is a schematic diagram of a battle board waiting for a battle according to an exemplary embodiment of this application.

For example, after receiving the battle signal, the target terminal first displays a battle board preview in the UI. As shown in the left of FIG. 7, a battle board preview 310 includes a plurality of arrayed lattices 320, each lattice is blocked by a blocking element 340, some lattices are displayed in red (which is represented by oblique lines in FIG. 7), and some lattices are displayed in green (which is represented by vertical lines in FIG. 7). A first placeholder identifier corresponding to the target account (an account corresponding to the target terminal) is red, and a second placeholder identifier corresponding to another account (an account corresponding to another terminal) is green. In the battle board preview 310, at least one of the lattices displayed in red in an initial state of the battle board displays the first placeholder identifier, and at least one of the lattices displayed in green in the initial state of the battle board displays the second placeholder identifier.

After displaying the battle board preview, the target terminal displays that the battle board enters the battle. As shown in the right of FIG. 7, a battle board 311 in an initial state includes a plurality of arrayed lattices 320, each lattice 320 displays a to-be-eliminated element 330, a lattice 721 displays the first placeholder identifier, and a lattice 722 displays the second placeholder identifier. The battle board 311 has the same lattice arrangement as the battle board preview 310, the lattice 721 is randomly selected from the lattices in the battle board preview 310 that are displayed in red, and the lattice 722 is randomly selected from the lattices in the battle board preview 310 that are displayed in green.

After entering the battle, the terminals respectively corresponding to the at least two accounts receive respective corresponding location switching instructions in respective rounds, and sequentially transmit the respective received location switching instructions to the server. The server transmits corresponding instructions to the at least two terminals according to the received location switching instructions, to display a battle picture of each round.

Step 605. The target terminal transmits an $i^{th}$ location switching instruction to the server in the $i^{th}$ round of n rounds.

In the $i^{th}$ round of the n rounds, after receiving the $i^{th}$ location switching instruction, the target terminal transmits the $i^{th}$ location switching instruction to the server. Optionally, a location switching instruction is an instruction triggered by at least one operation of a slide touch on the terminal, a physical handle manipulation, and a mouse slide to instruct to switch two adjacent to-be-eliminated elements.

Step 606. The server switches display locations of a first to-be-eliminated element and a second to-be-eliminated element in board data according to the $i^{th}$ location switching instruction.

After receiving the $i^{th}$ location switching instruction, the server switches display locations of the first to-be-eliminated element and the second to-be-eliminated element in the board data, for example, may interchange correspondences between the first to-be-eliminated element and a lattice and between the second to-be-eliminated element and a lattice, or may change reference coordinates of the first to-be-eliminated element and the second to-be-eliminated element on the battle board, that is, interchange the reference coordinates of the first to-be-eliminated element and the second to-be-eliminated element.

Step 607. The server transmits an elimination instruction to the terminals respectively corresponding to the at least two accounts when a predetermined quantity of to-be-eliminated elements of the same type are connected after the locations of the first to-be-eliminated element and the second to-be-eliminated element are switched.

After the locations of the first to-be-eliminated element and the second to-be-eliminated element are switched, the server detects whether a predetermined quantity of to-be-eliminated elements of the same type are connected. For example, the server may obtain to-be-eliminated elements in an adjacent relationship based on reference coordinates of each to-be-eliminated element on the battle board after the locations are switched, and queries, in the to-be-eliminated elements in the adjacent relationship according to a type corresponding to each to-be-eliminated element, whether a predetermined quantity of to-be-eliminated elements of the same type are present. If a predetermined quantity of to-be-eliminated elements of the same type are connected, the server determines to eliminate the predetermined quantity of to-be-eliminated elements of the same type, and transmits an elimination instruction to the terminals respectively corresponding to the at least two accounts.

Step 608. The target terminal displays elimination of the connected to-be-eliminated elements in the UI according to the elimination instruction.

After receiving the elimination instruction, the target terminal displays elimination of the connected to-be-eliminated elements in the UI. For a method for displaying elimination of the connected to-be-eliminated elements by the target terminal, reference may be made to the embodiment of FIG. 2, and details are not described herein again.

Step 609. The server determines, when the eliminated elements include a special element having a special elimination effect, a to-be-eliminated element that is eliminated by the special effect after the special element is eliminated, and transmits a special elimination instruction to the terminals respectively corresponding to the at least two accounts.

The server detects whether the eliminated elements include a special element. When the eliminated elements include a special element, the server determines whether an additional elimination effect is caused by a special effect of the special element. If an additional elimination effect is caused, the server determines, according to the additional elimination effect, a to-be-eliminated element that is eliminated by the special effect, and transmits a special elimination instruction to the terminals respectively corresponding to the at least two accounts.

Optionally, the special element includes an impact effect element, a lightening effect element, an addition effect element, or a treasure chest element. The special elimination instruction includes an impact elimination instruction or a lightening elimination instruction.

When determining that the eliminated elements include an impact effect element, the server determines an impact range corresponding to the impact effect element in the battle board according to a lattice location and an impact direction corresponding to the impact effect element, and transmits an impact elimination instruction to the terminals respectively corresponding to the at least two accounts.

Optionally, when an obstacle element is present in the impact direction, the server determines that the impact range includes a first lattice between the obstacle element and an edge to-be-eliminated element in a board column or row in which the impact direction is located, the first lattice including a lattice of the impact effect element. When no obstacle element is present in the impact direction, the server determines that the impact range includes all lattices in the board column or row in which the impact direction is located. After determining the impact range, the server transmits an impact elimination instruction to the terminals respectively corresponding to the at least two accounts.

When the eliminated elements include a lightening effect element, the server randomly determines a target lattice in lattices occupied by another account among the at least two accounts other than the target account, and transmits a lightening elimination instruction to the terminals corresponding to the at least two accounts.

Figure 12:
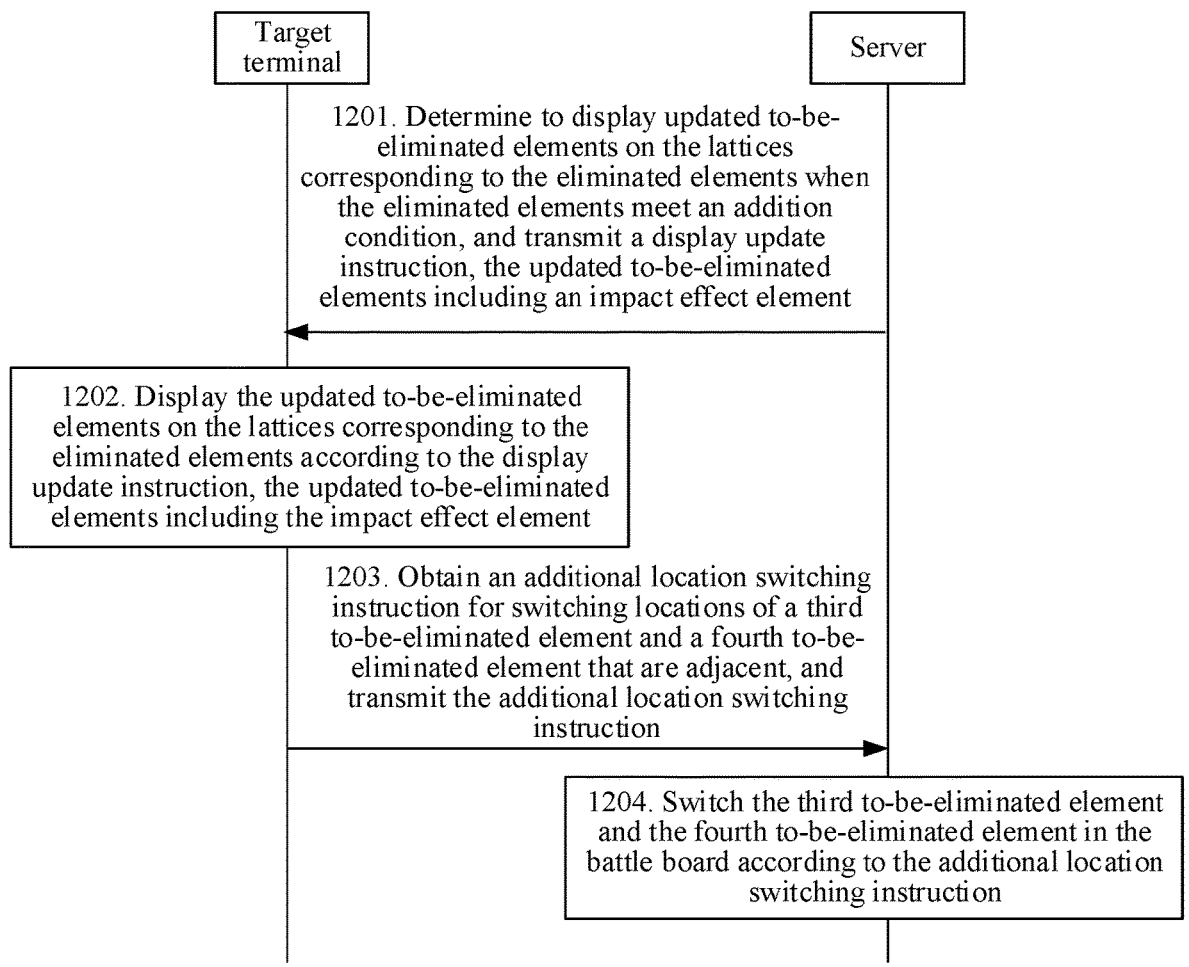
FIG. 12 is a flowchart of a method for displaying a battle interface in a terminal according to an exemplary embodiment of this application.

For steps needing to be performed by the server when the server determines that the eliminated elements include an addition effect element, reference may be made to an embodiment of FIG. 12, and details are not described herein.

When the server determines that the eliminated elements include a treasure chest element, and determines that an additional elimination effect is not caused when the treasure chest element is eliminated, step 611 is performed.

Step 610. The target terminal displays, in the UI, elimination of the to-be-eliminated element eliminated by the special elimination effect.

When the eliminated elements include the impact effect element, the terminal eliminates a to-be-eliminated element within the impact range according to the impact elimination instruction.

When the eliminated elements include the lightening effect element, the terminal eliminates a to-be-eliminated element in the target lattice according to the lightening elimination instruction.

For steps needing to be performed by the terminal when the eliminated elements include an addition effect element, reference may be made to the embodiment of FIG. 12, and details are not described herein.

Step 611. The server transmits a placeholder display instruction to the terminals respectively corresponding to the at least two accounts when the eliminated elements have a corresponding lattice having a first placeholder identifier.

When the eliminated elements (including the adjacent eliminated elements of the same type and the eliminated element eliminated by the special effect) have a corresponding lattice having the first placeholder identifier, the server transmits the placeholder display instruction to the terminals respectively corresponding to the at least two accounts.

Step 612. The target terminal displays placeholder identifiers of lattices corresponding to the eliminated elements as the first placeholder identifier according to the placeholder display instruction.

The target terminal displays the placeholder identifiers of the lattices corresponding to the eliminated elements as the first placeholder identifier according to the placeholder display instruction. The lattices displaying the first placeholder identifier are lattices occupied by the target account.

A method for eliminating, by the target terminal, a to-be-eliminated element according to a special elimination effect of an impact effect element after displaying elimination of the impact effect element is described below by using four specific embodiments.

Figure 8:
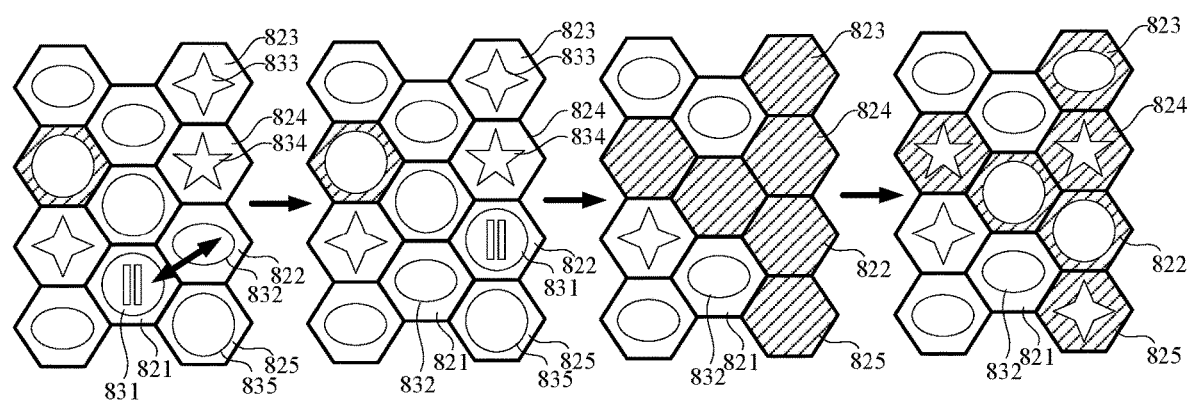
FIG. 8 is a schematic diagram of impact elimination of an impact effect element according to an exemplary embodiment of this application.

For example, as shown in FIG. 8, the UI of the target terminal displays a battle board, a lattice 821 of the battle board displays an impact effect element 831, a vertical line identifier in the impact effect element 831 indicates an impact direction of the impact effect element 831, and the impact direction is a column in which the impact effect element 831 is located.

After switching the impact effect element 831 and a to-be-eliminated element 832 according to arrow directions, the target terminal generates an $i^{th}$ location switching instruction, and transmits the $i^{th}$ location switching instruction to the server. After receiving the $i^{th}$ location switching instruction, the server determines that an elimination condition is met, and determines that the impact effect element 831 needs to be eliminated. Meanwhile, the server determines, according to an attribute of the impact effect element 831, that the impact direction of the impact effect element 831 is the column in which the impact effect element 831 is located, determines that an impact range of the impact effect element 831 includes the entire column of lattices 822, 823, 824, and 825 in the impact direction, and transmits an impact elimination instruction to the target terminal. After receiving the impact elimination instruction, the target terminal eliminates to-be-eliminated elements 833, 834, and 835 respectively corresponding to the lattices 823, 824, and 825. Therefore, eliminated elements in the $i^{th}$ round include three adjacent eliminated elements including the impact effect element 831, and the eliminated elements 833, 834, and 835 within the impact range. The server detects whether lattices corresponding to the eliminated elements in the $i^{th}$ round include a lattice having the first placeholder identifier, and transmits a placeholder display instruction to the target terminal when determining that the lattices corresponding to the eliminated elements in the $i^{th}$ round include a lattice having the first placeholder identifier. The target terminal displays, according to the placeholder display instruction, the first placeholder identifier corresponding to the target account on the lattices corresponding to the eliminated elements in the $i^{th}$ round, that is, displays the lattices in red (which is represented by oblique lines in FIG. 8) as lattices occupied by the target account. After determining the lattices occupied by the target account, the server determines updated to-be-eliminated elements on the lattices occupied by the target account, and transmits a display update instruction to the target terminal. After receiving the display update instruction transmitted by the server, the target terminal displays the updated to-be-eliminated elements on the lattices occupied by the target account.

Figure 9:
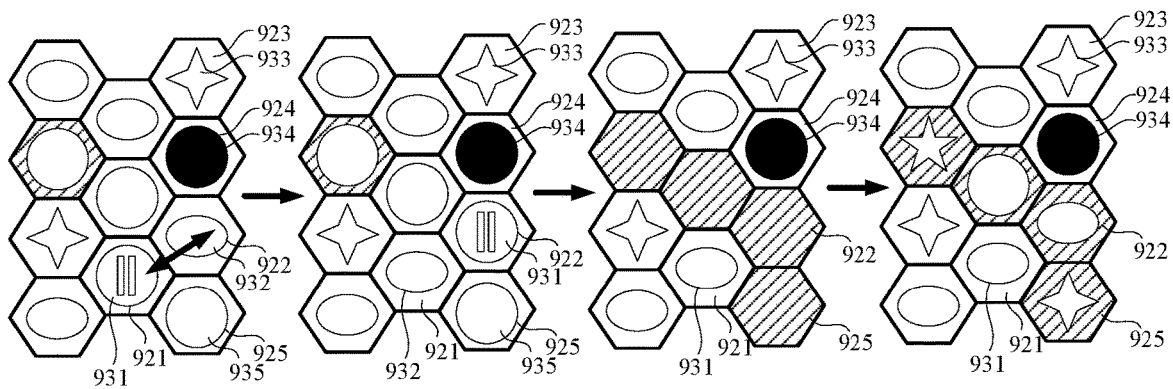
FIG. 9 is a schematic diagram of impact elimination of an impact effect element according to an exemplary embodiment of this application.

For example, as shown in FIG. 9, the UI of the target terminal displays a battle board, a lattice 921 of the battle board displays an impact effect element 931, a vertical line identifier in the impact effect element 931 indicates an impact direction of the impact effect element 931, the impact direction is a column in which the impact effect element 931 is located, and an obstacle element 934 is present in the impact direction of the impact effect element 931.

After switching the impact effect element 931 and a to-be-eliminated element 932 according to arrow directions, the target terminal generates an $i^{th}$ location switching instruction, and transmits the $i^{th}$ location switching instruction to the server. After receiving the $i^{th}$ location switching instruction, the server determines that the elimination condition is met, and determines that the impact effect element 931 needs to be eliminated. Meanwhile, the server determines, according to an attribute of the impact effect element 931, that the impact direction of the impact effect element 931 is the column in which the impact effect element 931 is located, and detects that the obstacle element 934 is present in the impact direction of the impact effect element 931. Therefore, the server determines that an impact range of the impact effect element 931 includes a lattice 925 in the impact direction, and transmits an impact elimination instruction to the target terminal. After receiving the impact elimination instruction, the target terminal eliminates a to-be-eliminated element 935 corresponding to the lattice 925. Therefore, eliminated elements in the $i^{th}$ round include three adjacent eliminated elements including the impact effect element 931, and the eliminated element 935 within the impact range. The server detects whether lattices corresponding to the eliminated elements in the $i^{th}$ round include a lattice having the first placeholder identifier, and transmits a placeholder display instruction to the target terminal when determining that the lattices corresponding to the eliminated elements in the $i^{th}$ round include a lattice having the first placeholder identifier. The target terminal displays, according to the placeholder display instruction, the first placeholder identifier corresponding to the target account on the lattices corresponding to the eliminated elements in the $i^{th}$ round, that is, displays the lattices in red (which is represented by oblique lines in FIG. 9) as lattices occupied by the target account. After determining the lattices occupied by the target account, the server determines updated to-be-eliminated elements on the lattices occupied by the target account, and transmits a display update instruction to the target terminal. After receiving the display update instruction transmitted by the server, the target terminal displays the updated to-be-eliminated elements on the lattices occupied by the target account.

Figure 10:
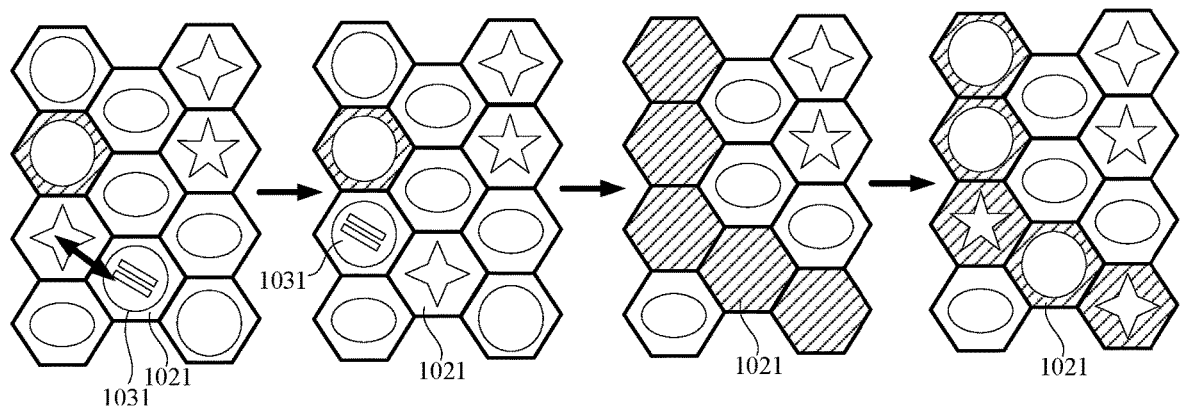
FIG. 10 is a schematic diagram of impact elimination of an impact effect element according to an exemplary embodiment of this application.

The impact direction of the impact effect element may be set to a different direction. As shown in FIG. 10, the UI of the target terminal displays a battle board, a lattice 1021 of the battle board displays an impact effect element 1031, an oblique line identifier in the impact effect element 1031 indicates an impact direction of the impact effect element 1031, and the impact direction is a row in which the impact effect element 1031 is located. Through interaction with the server, the target terminal displays elimination of to-be-eliminated elements within the impact range of the impact effect element 1031, and displays the first placeholder identifier on lattices corresponding to eliminated elements (which is represented by oblique lines in FIG. 10). For a method for displaying updated to-be-eliminated elements on the lattices corresponding to the eliminated elements, reference may be made to the foregoing embodiment, and details are not described herein again.

Figure 11:
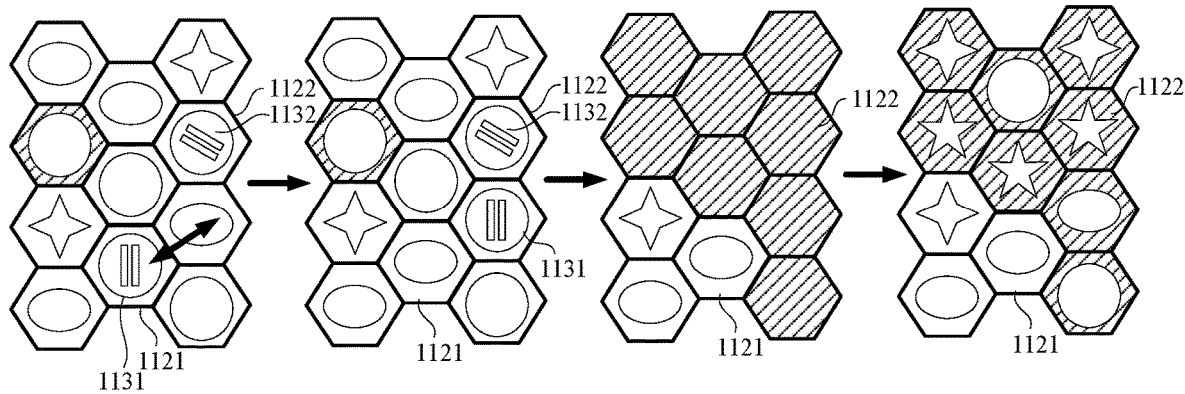
FIG. 11 is a schematic diagram of impact elimination of an impact effect element according to an exemplary embodiment of this application.

The impact effect element has an accumulative effect. As shown in FIG. 11, the UI of the target terminal displays a battle board, a lattice 1121 of the battle board displays an impact effect element 1131, a vertical line identifier in the impact effect element 1131 indicates that an impact direction of the impact effect element 1131 is a column in which the impact effect element 1131 is located, a lattice 1122 within an impact range of the impact effect element 1131 displays an impact effect element 1132, and an oblique line identifier in the impact effect element 1132 indicates that an impact direction of the impact effect element 1132 is a row in which the impact effect element 1132 is located. Through interaction with the server, the target terminal displays elimination of to-be-eliminated elements within the impact range of the impact effect element 1131, which include the impact effect element 1132. After displaying the elimination of the impact effect element 1131, the target terminal displays elimination of to-be-eliminated elements within the impact range of the impact effect element 1132, and displays the first placeholder identifier on lattices corresponding to eliminated elements (which is represented by oblique lines in FIG. 11). For a method for displaying updated to-be-eliminated elements on the lattices corresponding to the eliminated elements, reference may be made to the foregoing embodiment, and details are not described herein again.

Step 613. The server determines updated to-be-eliminated elements, and transmits a display update instruction to the terminals respectively corresponding to the at least two accounts.

After determining updated to-be-eliminated elements in the following manner, the server transmits a display update instruction to the terminals respectively corresponding to the at least two accounts.

When the eliminated elements include no treasure chest element, the server determines to randomly update the lattices corresponding to the eliminated elements with to-be-eliminated elements, and transmits a display update instruction to the terminals respectively corresponding to the at least two accounts.

When the eliminated elements include a treasure chest element, the server determines to update a lattice corresponding to the treasure chest element with a random to-be-eliminated element after the treasure chest element is eliminated, and transmits a display update instruction to the terminals respectively corresponding to the at least two accounts. The random to-be-eliminated element may include any one of a common to-be-eliminated element, an impact effect element, an addition effect element, and an obstacle element.

Optionally, when the server determines that i is greater than k or a difference between quantities of lattices respectively occupied by the at least two accounts is less than a third quantity threshold, the server determines that the updated to-be-eliminated elements include a lightening effect element, and transmits a display update instruction to the terminals respectively corresponding to the at least two accounts, k being a natural number, and $1 \leq k \leq n$.

When the battle between the at least two accounts is near the end of the battle, the accounts may tie with each other, making it difficult to determine a winner. Therefore, a lightening effect element needs to be added to the battle board, to eliminate lattices occupied by the opposite party, thereby facilitating opposition in the battle. The server detects whether i is greater than k, to determine whether the $i^{th}$ round is a round near the end of the battle, k being a relatively large value predetermined in the server. If the $i^{th}$ round is a round near the end of the battle, the server transmits a lightening effect element configuration instruction to the terminals respectively corresponding to the at least two accounts. After receiving the lightening effect element configuration instruction, the target terminal and another terminal additionally display a lightening effect element on the battle board randomly.

Optionally, when the server determines that a quantity of lattices having the first placeholder identifier in the battle board reaches a second quantity threshold, the server determines that the updated to-be-eliminated elements include a treasure chest element and/or an obstacle element, and transmits a display update instruction to the terminals respectively corresponding to the at least two accounts.

When one of the at least two accounts occupies more lattices and has an obvious advantage, a treasure chest element needs to be added to the battle board, to make the battle more dramatic through elimination of the treasure chest element.

Step 614. The target terminal displays the updated to-be-eliminated elements on the lattices corresponding to the eliminated elements according to the display update instruction.

When the eliminated elements include no treasure chest element, the target terminal randomly generates to-be-eliminated elements on the lattices corresponding to the eliminated elements according to the display update instruction.

When the eliminated elements include a treasure chest element, the target terminal randomly generates a random to-be-eliminated element on a lattice corresponding to the treasure chest element and randomly generates to-be-eliminated elements on lattices corresponding to other eliminated elements according to the display update instruction. The random to-be-eliminated element may include any one of a common to-be-eliminated element, an impact effect element, an addition effect element, and an obstacle element.

When i is greater than k or a difference between quantities of lattices respectively occupied by the at least two accounts is less than the third quantity threshold, the target terminal randomly generates and displays at least one lightening effect element on the lattices corresponding to the eliminated elements according to the display update instruction.

When a quantity of lattices having the first placeholder identifier in the battle board reaches the second quantity threshold, the target terminal randomly generates and displays at least one treasure chest element on the lattices corresponding to the eliminated elements according to the display update instruction.

Step 615. The server determines a winner among the at least two accounts according to placeholder identifiers of lattices on the battle board and a winning condition, and transmits a winner display instruction to the terminals respectively corresponding to the at least two accounts.

After at least one round, the server determines that the winning condition is met and determines the winner among the at least two accounts according to the placeholder identifiers of the lattices on the battle board and the winning condition, and transmits the winner display instruction to the terminals respectively corresponding to the at least two accounts. For an example method for determining a winner by the server, reference may be made to the embodiment of FIG. 2, and details are not described herein.

Step 616. The target terminal displays the winner among the at least two accounts in the UI according to the winner display instruction.

After receiving the winner display instruction, the target terminal displays the winner among the at least two accounts in the UI.

Based on the above, in this embodiment of this application, location switching instructions of at least two terminals in respective rounds on the same battle board are received, and elimination operations performed on to-be-eliminated elements on the battle board and/or effects of occupying lattices on the battle board by accounts corresponding to the at least two terminals are synchronously displayed on the battle board in real time, which resolves a problem of a relatively large synchronization delay caused as two battle parties eliminate to-be-eliminated elements on respective maps and the elimination of the to-be-eliminated elements is displayed on the respective maps in the related art. Because operations of all the accounts in respective rounds are synchronously displayed on the same battle map, a battle synchronization delay is reduced.

Optionally, in this embodiment of this application, a special to-be-eliminated element is displayed on the battle board, an additional elimination effect is present after the special to-be-eliminated element is eliminated, and each account may occupy more lattices in a respective round by eliminating the special to-be-eliminated element, which improves diversity of the method for displaying a battle interface in a terminal.

Optionally, in this embodiment of this application, a special to-be-eliminated element is displayed on the battle board, and the special to-be-eliminated element may be randomly updated with a common to-be-eliminated element or another special to-be-eliminated element after being eliminated, which improves winner randomness in the method for displaying a battle interface in a terminal.

Optionally, in this embodiment of this application, when a quantity of lattices occupied by one of the at least two accounts in the battle exceeds a quantity threshold, a treasure chest element and/or an obstacle element is added to the battle board, which can prolong a battle time, thereby resolving a problem of a relatively short display time in the method for displaying a battle interface in a terminal, and increasing, to some extent, a relative display time in the method for displaying a battle interface in a terminal.

Optionally, in this embodiment of this application, after the server determines that the battle comes to the last several rounds, a lightening effect element is added to the battle board, and after the lightening effect element is eliminated, a current account may randomly occupy a lattice occupied by another account, which reduces a battle time, resolves a problem of a relatively long display time in the method for displaying a battle interface in a terminal, and reduces, to some extent, a relative display time in the method for displaying a battle interface in a terminal.

Optionally, in this embodiment of this application, the historical win rate grades corresponding to the plurality of accounts are obtained, and at least two accounts whose difference between historical win rate grades is less than the difference threshold are assigned to the same battle board, which avoids assigning accounts with an excessively large difference between historical win rate grades to the same battle board, and improves fairness of the method for displaying a battle interface in a terminal.

Optionally, in this embodiment of this application, the battle board is randomly determined according to the board library corresponding to the first historical win rate grade of the target account, which avoids a problem of battle monotony caused by always using the same battle board to battle, which improves diversity of the method for displaying a battle interface in a terminal.

FIG. 12 is a flowchart of a method for displaying a battle interface in a terminal according to an exemplary embodiment of this application. This embodiment is described by using an example that the method is applied to the computer system 100 in FIG. 1. The method may be an optional embodiment of step 609 in the embodiment of FIG. 6. The method includes the following steps:

Step 1201. The server determines to display updated to-be-eliminated elements on the lattices corresponding to the eliminated elements when the eliminated elements meet an addition condition, and transmits a display update instruction to the terminals respectively corresponding to the at least two accounts, the updated to-be-eliminated elements including an impact effect element.

The server detects whether the eliminated elements meet an addition condition, and when determining to display updated to-be-eliminated elements on the lattices corresponding to the eliminated elements, transmits a display update instruction to the terminals respectively corresponding to the at least two accounts, the updated to-be-eliminated elements including an impact effect element. The addition condition includes: a quantity of the eliminated elements being greater than a first quantity threshold, and/or the eliminated elements including an addition effect element.

To improve game enjoyment, a bonus round may be set when the eliminated elements reach the addition condition. The addition condition may be: a relatively large quantity of to-be-eliminated elements being eliminated, or the eliminated elements including a third special pattern element. The third special pattern element may trigger the bonus round, and in the bonus round, the lattices corresponding to the eliminated elements are updated with an impact effect element.

Step 1202. The target terminal displays the updated to-be-eliminated elements on the lattices corresponding to the eliminated elements according to the display update instruction, the updated to-be-eliminated elements including the impact effect element.

The target terminal displays the updated to-be-eliminated elements on the lattices corresponding to the eliminated elements according to the display update instruction, the updated to-be-eliminated elements including at least one randomly generated updated impact effect element.

Step 1203. The target terminal obtains an additional location switching instruction used for switching locations of a third to-be-eliminated element and a fourth to-be-eliminated element that are adjacent, and transmits the additional location switching instruction to the server.

After receiving the additional location switching instruction, the target terminal transmits the additional location switching instruction to the server. Optionally, the additional location switching instruction is an instruction triggered by at least one operation of a slide touch on the target terminal, a physical handle manipulation, and a mouse slide to instruct to switch the third to-be-eliminated element and the fourth to-be-eliminated element that are adjacent. After the locations of the third to-be-eliminated element and the fourth to-be-eliminated element are switched, the updated impact effect element may or may not be eliminated.

Step 1204. The server switches the third to-be-eliminated element and the fourth to-be-eliminated element in the board data according to the additional location switching instruction.

After receiving the additional location switching instruction, the server switches the third to-be-eliminated element and the fourth to-be-eliminated element in the board data according to the additional location switching instruction. For an elimination effect after the third to-be-eliminated element and the fourth to-be-eliminated element are switched, reference may be made to the foregoing embodiment, and details are not described herein again.

Based on the above, in this embodiment of this application, after the addition condition is met, the lattices corresponding to the eliminated elements are updated to display at least one impact effect element, and the account corresponding to the round is permitted to operate one more time, which improves diversity of the method for displaying a battle interface in a terminal.

Apparatus embodiments of this application are described below. For details that are not described in the apparatus embodiments, reference may be made to the foregoing method embodiments in a one-to-one correspondence with the apparatus embodiments.

Figure 13:
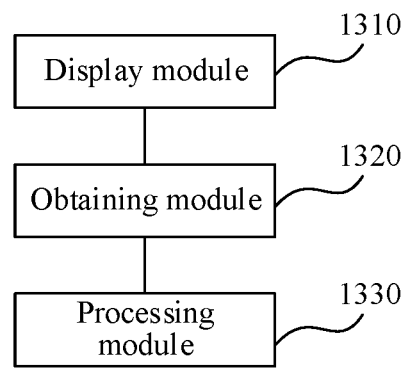
FIG. 13 is a block diagram of an apparatus for displaying a battle interface according to an exemplary embodiment of this application.

FIG. 13 is a structural block diagram of an apparatus for displaying a battle interface according to an exemplary embodiment of this application. The apparatus may be implemented as the terminal 110 in the implementation environment shown in FIG. 1 by using software, hardware, or a combination thereof. As shown in FIG. 13, the apparatus includes: a display module 1310, an obtaining module 1320, and a processing module 1330.

The display module 1310 is configured to display a battle board in a UI of a terminal screen, a plurality of arrayed lattices in the battle board being used for displaying respective corresponding to-be-eliminated elements and placeholder identifiers, and a placeholder identifier of at least one lattice in an initial state being a first placeholder identifier corresponding to a current account.

The obtaining module 1320 is configured to obtain, in the $i^{th}$ round of n rounds, an $i^{th}$ location switching instruction used for switching locations of a first to-be-eliminated element and a second to-be-eliminated element that are adjacent, the n rounds being operation timing units in which at least two accounts alternately have operation permission, the $i^{th}$ round being a round in which the current account has operation permission, n being a natural number, i being a natural number, and $1 \leq i \leq n$.

The processing module 1330 is configured to switch the first to-be-eliminated element and the second to-be-eliminated element according to the $i^{th}$ location switching instruction; and eliminate, in a case that a predetermined quantity of to-be-eliminated elements of the same type are connected after the locations of the first to-be-eliminated element and the second to-be-eliminated element are switched, the connected to-be-eliminated elements.

The display module 1310 is further configured to display placeholder identifiers of lattices corresponding to the eliminated elements as the first placeholder identifier in a case that the eliminated elements include a to-be-eliminated element having the first placeholder identifier; and display a winner among the at least two accounts according to the placeholder identifiers of the lattices on the battle board and a winning condition.

In an optional embodiment, the processing module 1330 is further configured to eliminate, in a case that the eliminated elements include an impact effect element, a to-be-eliminated element within an impact range corresponding to the impact effect element; and the display module 1310 is further configured to display a placeholder identifier of a lattice within the impact range as the first placeholder identifier;

the impact range being determined in the battle board according to a lattice location and an impact direction corresponding to the impact effect element.

In an optional embodiment, the display module 1310 is further configured to display updated to-be-eliminated elements on the lattices corresponding to the eliminated elements;

the processing module 1330 is further configured to eliminate, in a case that the updated to-be-eliminated elements include an impact effect element, a to-be-eliminated element within an impact range corresponding to the impact effect element; and the display module 1310 is further configured to display a placeholder identifier of a lattice within the impact range as the first placeholder identifier;

the impact range being determined in the battle board according to a lattice location and an impact direction corresponding to the impact effect element.

In an optional embodiment, in a case that an obstacle element is present in the impact direction, the impact range includes a first lattice between the obstacle element and an edge to-be-eliminated element in a board column or row in which the impact direction is located, the first lattice including a lattice of the impact effect element; and in a case that no obstacle element is present in the impact direction, the impact range includes all lattices in the board column or row in which the impact direction is located.

In an optional embodiment, the display module 1310 is further configured to display updated to-be-eliminated elements on the lattices corresponding to the eliminated elements in a case that the eliminated elements meet an addition condition, the updated to-be-eliminated elements including an impact effect element;

the obtaining module 1320 is further configured to obtain, in the $i^{th}$ round, an additional location switching instruction used for switching locations of a third to-be-eliminated element and a fourth to-be-eliminated element that are adjacent; and the processing module 1330 is further configured to switch the third to-be-eliminated element and the fourth to-be-eliminated element according to the additional location switching instruction;

the addition condition including: a quantity of the eliminated elements being greater than a first quantity threshold, and/or the eliminated elements including an addition effect element.

In an optional embodiment, the display module 1310 is further configured to additionally display a treasure chest element and/or an obstacle element in the battle board randomly in a case that a quantity of lattices having the first placeholder identifier in the battle board reaches a second quantity threshold, a random to-be-eliminated element being displayed as an updated to-be-eliminated element after the treasure chest element is eliminated, the random to-be-eliminated element including any one of the to-be-eliminated element, the impact effect element, and the obstacle element.

In an optional embodiment, the display module 1310 is further configured to additionally display a lightening effect element in the battle board randomly in a case that i is greater than k or a difference between quantities of lattices respectively occupied by the at least two accounts is constantly less than a third quantity threshold in a predetermined duration, k being a natural number, and $1 \leq k \leq n$;

the processing module 1330 is further configured to eliminate, in a case that the eliminated elements include the lightening effect element, a to-be-eliminated element in a target lattice occupied by another account among the at least two accounts other than the current account; and the display module 1310 is further configured to display a placeholder identifier of the target lattice as the first placeholder identifier;

the target lattice being randomly determined in lattices occupied by the another account.

In an optional embodiment, the display module 1310 is further configured to display an account occupying the most lattices among the at least two accounts as the winner after the n rounds; or display the current account as the winner in a case that a quantity of lattices occupied by the current account is greater than a fourth quantity threshold; or display a target account as the winner in a case that the target account occupies all the lattices in the battle board after the $i^{th}$ round;

a lattice having a $i^{th}$ placeholder identifier in the battle board being a lattice occupied by a $j^{th}$ account of the at least two accounts, and j being a natural number.

In an optional embodiment, the display module 1310 is further configured to display the current account as the winner after the $i^{th}$ round in a case that no location switching instruction is received from another account among the at least two accounts other than the current account within a first predetermined time in the first round to the $(i-1)^{th}$ round of the n rounds; or display the current account as the winner after the $i^{th}$ round in a case that no location switching instruction is received from the another account within a second predetermined time in a predetermined quantity of rounds of the first round to the $(i-1)^{th}$ round; or display an account executing an $n^{th}$ location switching instruction as the winner in a case that quantities of lattices occupied by all the accounts among the at least two accounts are the same after the n rounds.

Figure 14:
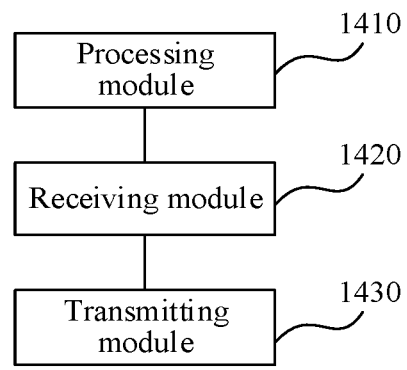
FIG. 14 is a block diagram of an apparatus for displaying a battle interface according to an exemplary embodiment of this application.

FIG. 14 is a structural block diagram of an apparatus for displaying a battle interface according to an exemplary embodiment of this application. The apparatus may be implemented as at least one server in the server system 120 in the implementation environment shown in FIG. 1 by using software, hardware, or a combination thereof. As shown in FIG. 14, the apparatus includes: a processing module 1410, a receiving module 1420, and a transmitting module 1430.

The processing module 1410 is configured to record board data of a battle board, the battle board including a plurality of arrayed lattices, and the board data including to-be-eliminated elements and placeholder identifiers displayed on the lattices.

The receiving module 1420 is configured to receive, in the $i^{th}$ round of n rounds, an $i^{th}$ location switching instruction transmitted by a target terminal corresponding to a target account, the $i^{th}$ location switching instruction being used for switching locations of a first to-be-eliminated element and a second to-be-eliminated element that are adjacent, the n rounds being operation timing units in which at least two accounts alternately have operation permission, and the $i^{th}$ round being a round in which the target account of the at least two accounts has operation permission.

The processing module 1410 is further configured to switch display locations of the first to-be-eliminated element and the second to-be-eliminated element in the board data according to the $i^{th}$ location switching instruction.

The transmitting module 1430 is configured to transmit a first instruction to terminals respectively corresponding to the at least two accounts in a case that a predetermined quantity of to-be-eliminated elements of the same type are connected after the locations of the first to-be-eliminated element and the second to-be-eliminated element are switched, the first instruction being used for instructing to eliminate the connected eliminated elements; transmit a second instruction to the terminals respectively corresponding to the at least two accounts in a case that the eliminated elements include a to-be-eliminated element having a first placeholder identifier, the second instruction being used for instructing to display placeholder identifiers of lattices corresponding to the eliminated elements as the first placeholder identifier, the first placeholder identifier being a placeholder identifier corresponding to the target account; and determine a winner among the at least two accounts according to the placeholder identifiers of the lattices on the battle board and a winning condition, and transmit a third instruction to the terminals respectively corresponding to the at least two accounts, the third instruction being used for instructing to display the winner among the at least two accounts.

In an optional embodiment, the processing module 1410 is further configured to determine, in a case that the eliminated elements include an impact effect element, an impact range corresponding to the impact effect element in the battle board according to a lattice location and an impact direction corresponding to the impact effect element; and the transmitting module 1430 is further configured to transmit a fourth instruction to the terminals respectively corresponding to the at least two accounts, the fourth instruction being used for instructing to eliminate a to-be-eliminated element within the impact range, and display a placeholder identifier of a lattice within the impact range as the first placeholder identifier.

In an optional embodiment, the processing module 1410 is further configured to determine updated to-be-eliminated elements on the lattices corresponding to the eliminated elements; and determine, in a case that the updated to-be-eliminated elements include an impact effect element, an impact range corresponding to the impact effect element in the battle board according to a lattice location and an impact direction corresponding to the impact effect element; and the transmitting module 1430 is further configured to transmit a fifth instruction to the terminals respectively corresponding to the at least two accounts, the fifth instruction being used for instructing to display the updated to-be-eliminated elements, eliminate a to-be-eliminated element within the impact range corresponding to the impact effect element, and display a placeholder identifier of a lattice within the impact range as the first placeholder identifier.

In an optional embodiment, the processing module 1410 is further configured to determine, in a case that an obstacle element is present in the impact direction, that the impact range includes a first lattice between the obstacle element and an edge to-be-eliminated element in a board column or row in which the impact direction is located according to the lattice location and the impact direction corresponding to the impact effect element, the first lattice including a lattice of the impact effect element; and determine, in a case that no obstacle element is present in the impact direction, that the impact range includes all lattices in the board column or row in which the impact direction is located according to the lattice location and the impact direction corresponding to the impact effect element.

In an optional embodiment, the processing module 1410 is further configured to determine updated to-be-eliminated elements on the lattices corresponding to the eliminated elements in a case that the eliminated elements meet an addition condition, the updated to-be-eliminated elements including an impact effect element;

the transmitting module 1430 is further configured to transmit a fifth instruction to the terminals corresponding to the at least two accounts, the fifth instruction being used for instructing to display the updated to-be-eliminated elements; and the receiving module 1420 is further configured to receive, in the $i^{th}$ round, an additional location switching instruction transmitted by the target terminal and used for switching locations of a third to-be-eliminated element and a fourth to-be-eliminated element that are adjacent; and switch the third to-be-eliminated element and the fourth to-be-eliminated element in the board data according to the additional location switching instruction;

the addition condition including: a quantity of the eliminated elements being greater than a first quantity threshold, and/or the eliminated elements including an addition effect element.

In an optional embodiment, the processing module 1410 is further configured to generate a sixth instruction according to first configuration information in a case that a quantity of lattices having the first placeholder identifier in the battle board reaches a second quantity threshold, the sixth instruction being used for instructing to additionally display a treasure chest element and/or an obstacle element in the battle board randomly, a random to-be-eliminated element being displayed as an updated to-be-eliminated element after the treasure chest element is eliminated, the random to-be-eliminated element including any one of the to-be-eliminated element, the impact effect element, and the obstacle element; and the transmitting module 1430 is further configured to transmit the sixth instruction to the terminals corresponding to the at least two accounts.

In an optional embodiment, the processing module 1410 is further configured to generate a seventh instruction according to second configuration information in a case that i is greater than k or a difference between quantities of lattices respectively occupied by the at least two accounts is less than a third quantity threshold, the seventh instruction being used for instructing to additionally display a lightening effect element in the battle board randomly, k being a natural number, and $1 \le k \le n$; and the transmitting module 1430 is further configured to randomly determine a target lattice in lattices occupied by another account among the at least two accounts other than the target account in a case that the eliminated elements include the lightening effect element, and transmit an eighth instruction to the terminals corresponding to the at least two accounts, the eighth instruction being used for instructing to eliminate a to-be-eliminated element in the target lattice, and display a placeholder identifier of the target lattice as the first placeholder identifier.

In an optional embodiment, the processing module 1410 is further configured to determine an account occupying the most lattices among the at least two accounts as the winner after the n rounds; or determine the target account as the winner in a case that a quantity of lattices occupied by the target account is greater than a fourth quantity threshold; or determine the target account as the winner in a case that the target account occupies all the lattices in the battle board after the $i^{th}$ round; and the transmitting module 1430 is further configured to transmit a ninth instruction to the terminals corresponding to the at least two accounts, the ninth instruction being used for instructing to display the winner;

a lattice having a $i^{th}$ placeholder identifier in the battle board being a lattice occupied by a $i^{th}$ account of the at least two accounts, and j being a natural number.

In an optional embodiment, the processing module 1410 is further configured to determine the target account as the winner after the $i^{th}$ round in a case that no location switching instruction is received from another account among the at least two accounts other than the target account within a first predetermined time in the first round to the $(i-1)^{th}$ round of the n rounds; or determine the target account as the winner after the $i^{th}$ round in a case that no location switching instruction is received from the another account within a second predetermined time in a predetermined quantity of rounds of the first round to the $(i-1)^t$ round; or determine an account executing an $n^{th}$ location switching instruction as the winner in a case that quantities of lattices occupied by all the accounts among the at least two accounts are the same after the n rounds; and the transmitting module 1430 is further configured to transmit a ninth instruction to the terminals corresponding to the at least two accounts, the ninth instruction being used for instructing to display the winner.

In an optional embodiment, the processing module 1410 is further configured to obtain historical win rate grades corresponding to a plurality of accounts, and assign the at least two accounts whose difference between historical win rate grades is less than a difference threshold to the same battle board; and the transmitting module 1430 is further configured to transmit a battle start signal to the at least two accounts, the battle start signal being used for instructing to perform a battle on the battle board.

In an optional embodiment, the processing module 1410 is further configured to determine a first historical win rate grade of the target account; perform first matching in a first account matching pool corresponding to the first historical win rate grade; perform second matching in a second account matching pool corresponding to a second historical win rate grade in a case that the first matching fails, the second historical win rate grade being one grade higher than the first historical win rate grade; perform third matching in a third account matching pool corresponding to a third historical win rate grade in a case that the second matching fails, the third historical win rate grade being one grade lower than the second historical win rate grade; and assign, in a case that the first matching, the second matching, or the third matching succeeds, the at least two accounts matched successfully to the same battle board.

In an optional embodiment, the processing module 1410 is further configured to randomly determine the battle board from a board library corresponding to the first historical win rate grade of the target account.

In an optional embodiment, the processing module 1410 is further configured to randomly determine placeholder identifiers of the lattices in an initial state in the battle board, a placeholder identifier corresponding to each of the at least two accounts being corresponding to at least one lattice.

In this embodiment of this application, the first instruction to the ninth instruction may be the same or different instructions, which may include at least one of the elimination instruction, the special elimination instruction, the impact elimination instruction, the lightening elimination instruction, the placeholder display instruction, the display update instruction, the winner display instruction, and the additional location switching instruction in the embodiments of FIG. 6 and FIG. 12.

Figure 15:
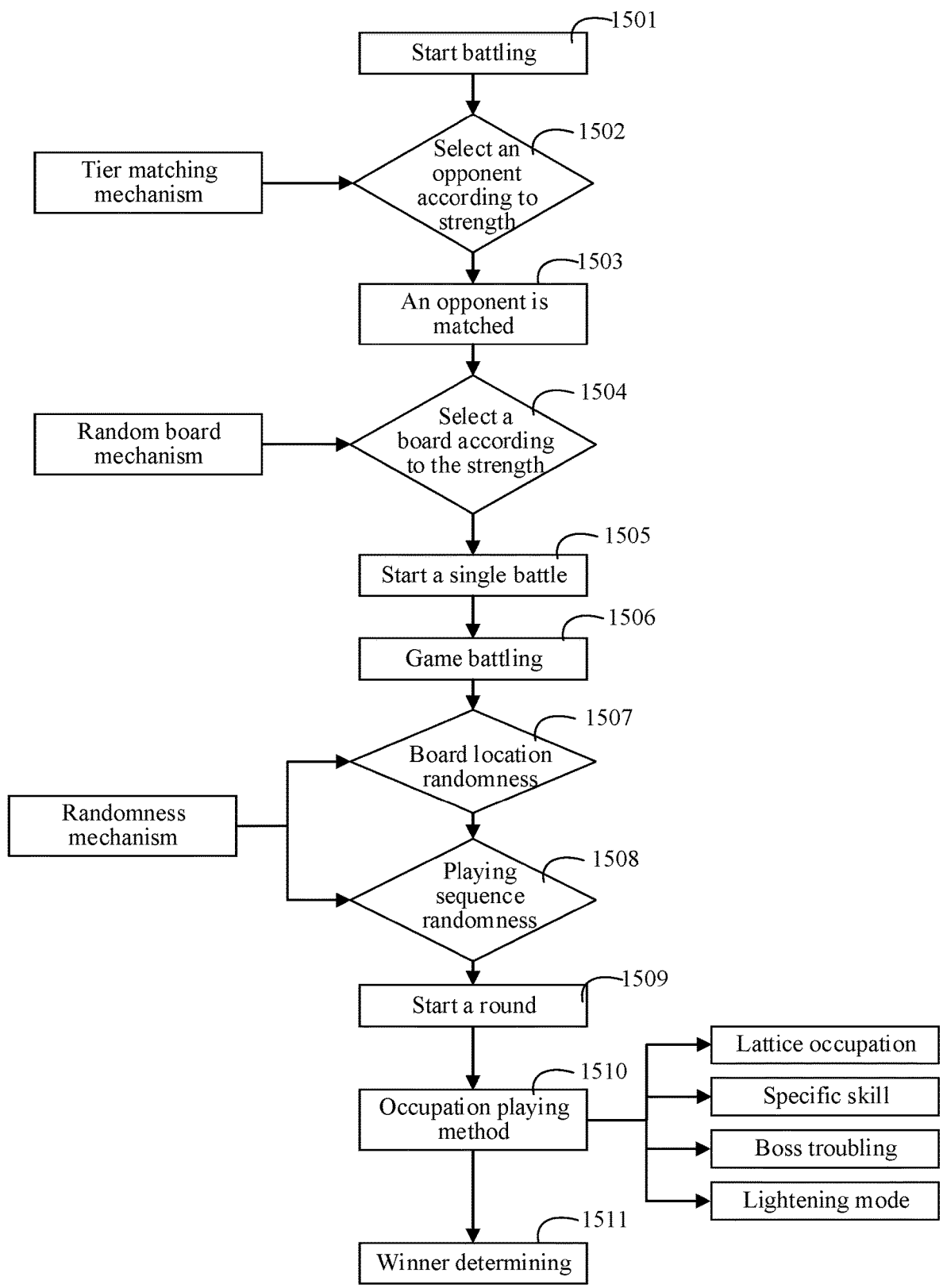
FIG. 15 is a schematic diagram of steps performed by a game platform in a battling process according to an exemplary embodiment of this application.

In an example, a game manufacturer provides a game platform and an application program. Players (user accounts) may download and install the application program on their terminals. The application program is a program supporting a tile-matching game function. Using a battle of two players as an example, as shown in FIG. 15, in a battling process, the game platform performs the following steps:

Step 1501. Start battling.

After logging in to the application program in a first terminal by using a first account, a player A may click/tap "start to match" in the application program to start double tile-matching game battling. Similarly, after logging in to the application program in a second terminal by using a second account, a player B may click/tap "start to match" in the application program to start double tile-matching game battling. In this case, both the player A and the player B are in a to-be-matched state.

When there are a relatively large quantity of players, a plurality of players are in the to-be-matched state at the same time.

Step 1502. Select an opponent according to strength.

The game platform selects an opponent according to strength of each player. For example, the game platform determines a corresponding historical win rate grade for each player according to a historical record of each player, the historical win rate grade being referred to as a tier for short. The game platform measures a game level of a player by tiers. A specific measurement manner is as follows: The player gains 1 point of experience for each win, which is equivalent to raising a strength grade in the game, and loses 1 point of experience for each loss, which is equivalent to lowering a strength grade in the game. The game platform finds an opponent for a current player by using tier matching mechanism, and randomly determines a battle board in each battle.

For example, a tier rule is as follows: Tiers in the game platform are classified into five major tiers, each major tier is divided into fine grades, and fine tiers are distinguished by using fine grades. A name of each fine tier includes a tier name+a grade name, for example, "bronze III". Each fine tier has a win times requirement. The win times is increased by 1 for each win of the player, and is subtracted by 1 for each loss. The tier/grade is raised by accumulative wins.

For corresponding tiers/grades, battle boards are randomly selected from specified level libraries, and the battle boards are completely different in board arrangements and to-be-eliminated elements. In an example, currently, 65 completely different board arrangements are designed in total. As shown in the following Table 1:

TABLE 1

| Tier | Win times (stars) | Battle board library |
| --- | --- | --- |
| Bronze III | 3 | 1 |
| Bronze II | 3 | 1 |
| Bronze I | 3 | 1 |
| Silver III | 4 | 2 |
| Silver II | 4 | 2 |
| ... | ... | ... |
| Challenger of elimination | Accumulative wins N (99999) | 4 |

Optionally, the game platform obtains historical win rate grades corresponding to a plurality of accounts, and assigns at least two accounts whose difference between historical win rate grades is less than a difference threshold to the same battle board; and transmits a battle start signal to the at least two accounts, the battle start signal being used for instructing to battle on the battle board. Optionally, the game platform determines a first historical win rate grade corresponding to a current account; performs first matching in a first account matching pool corresponding to the first historical win rate grade; performs second matching in a second account matching pool corresponding to a second historical win rate grade in a case that the first matching fails, the second historical win rate grade being one grade higher than the first historical win rate grade; performs third matching in a third account matching pool corresponding to a third historical win rate grade in a case that the second matching fails, the third historical win rate grade being one grade lower than the second historical win rate grade; and assigns, in a case that the first matching, the second matching, or the third matching succeeds, the at least two accounts matched successfully to the same battle board.

Figure 16:
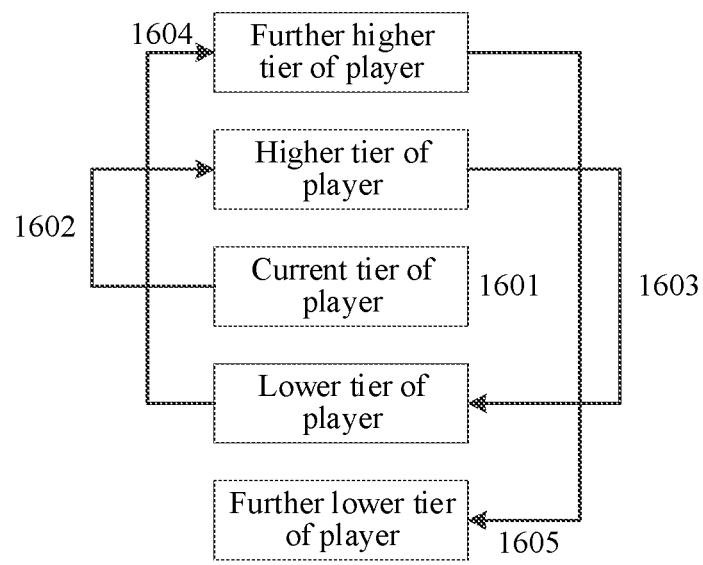
FIG. 16 is a schematic diagram of tier matching according to an exemplary embodiment of this application.

For example, as shown in FIG. 16, the tier matching rule is as follows: The game platform assigns players belonging to the same tier to the same player library. Step 1601: First, first matching is performed in a first player library of a current tier of the player. Step 1602: When the first matching fails, second matching is performed in a second player library of a higher tier of the player. Step 1603: When the second matching fails, third matching is performed in a third player library of a lower tier of the player. Step 1604: When the third matching fails, fourth matching is performed in a fourth player library of a further higher tier of the player. Step 1605: When the fourth matching fails, fifth matching is performed in a fifth player library of a further lower tier of the player.

A player successfully matched in a matching process of any one of the first matching, the second matching, the third matching, the fourth matching, or the fifth matching succeeds is determined as an opponent of the current player.

Figure 17:
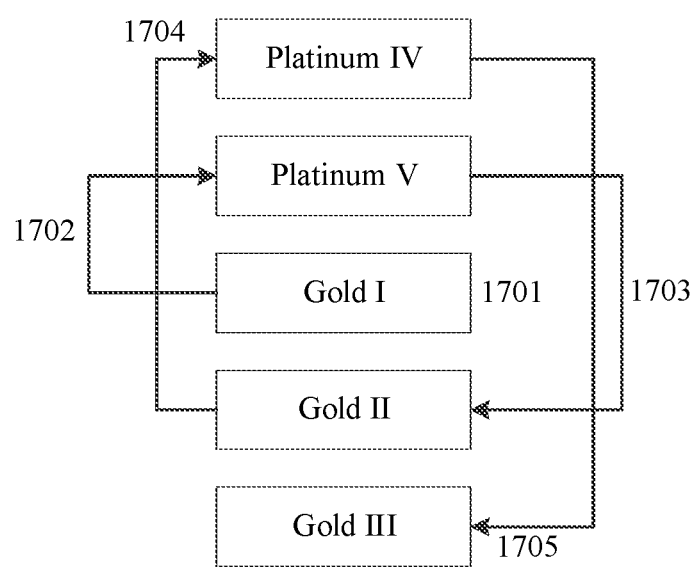
FIG. 17 is a schematic diagram of tier matching according to an exemplary embodiment of this application.

For example, as shown in FIG. 17, the current tier of the player is a gold I tier. Step 1701: First, first matching is performed in a player library of the gold I tier. Step 1702: When the first matching fails, second matching is performed in a player library of a platinum V tier. Step 1703: When the second matching fails, third matching is performed in a player library of a gold II tier. Step 1704: When the third matching fails, fourth matching is performed in a player library of a platinum IV tier. Step 1705: When the fourth matching fails, fifth matching is performed in a player library of a gold III tier.

In this example, a maximum range of a matching process is provisionally ±two grades, that is, covers five matching pools, which may be adjusted according to an actual situation.

A matching duration, that is, a maximum theoretical matching time, needs to be configured to prevent the player from being stuck in a matching interface.

The matching fails in the following cases: 1. The player actively cancels the matching. 2. No opponent can be matched in player libraries or matching pools within the maximum range. 3. A matching duration reaches a maximum time limit. 4. In a matching process, a matching interrupt is caused because the player is disconnected or a process ends.

Step 1503. An opponent is matched.

Optionally, the game platform assigns the current player and the matched opponent player to the same game environment. The game environment may be uniquely determined by using information such as a game room and a battle board.

Step 1504. Select a board according to the strength.

Optionally, the game platform further randomly determines a battle board from a board library corresponding to the first historical win rate grade of the current account. Battle boards selected for players at different tiers to battle need to be randomly determined according to the tiers of the players from random battle board libraries of the corresponding tiers.

The player may be matched with an opponent at a different tier. For example, a player at gold I may be matched with a player at platinum V. Therefore, two tiers are involved. In this case, a board may be randomly determined from two battle board libraries. Alternatively, a player is randomly selected as a home layer (or a player in a specific color is fixed as a home layer), and a board is randomly determined from a board library corresponding to a tier of the player. In an actual case, a solution is selected for convenience of the game platform. For example, Table 2 shows a correspondence between a tier and a random battle board library.

TABLE 2

| Tier | Random battle board library |
| --- | --- |
| Bronze | Battle board library 1 |
| Silver | Battle board library 2 |
| Gold | Battle board library 3 |
| Platinum | Battle board library 4 |
| Diamond/Challenger | Battle board library 5 |

Step 1505. Start a single battle.

After determining a battle board used for a current battle, the game platform transmits a battle start signal to two matched players, to guide the two players to start a single tile-matching game battle.

Step 1506. Game battling.

A first player and a second player start a game battle. The game platform creates battle data corresponding to the battle. The battle data includes at least one of player information, a total quantity of rounds, a number of a battle board, and board data of the battle board.

To provide different game experiences, the game platform further provides a randomness mechanism. The randomness mechanism includes a board location randomness mechanism and a playing sequence randomness mechanism.

Step 1507. Board location randomness.

In an initial state, each player occupies n lattices in the battle board, n being a predetermined value and less than or equal to ½ of the total quantity of lattices. For example, locations of lattices occupied by the first player and the second player are randomly determined by the game platform. That is, the game platform randomly determines placeholder identifiers of lattices in the initial state in the battle board, a placeholder identifier corresponding to each of at least two accounts being corresponding to at least one lattice.

Step 1508. Playing sequence randomness.

The playing sequence randomness means that the game platform randomly assigns operation permission in the first round to one of the at least two accounts. That is, which player operates in the first round is randomly determined by the game platform.

Step 1509. Start a round.

Starting from the first round, the game platform receives a location switching instruction transmitted by a terminal currently having operation permission, and performs the tile-matching game battle according to the location switching instruction; then starts the second round, and so on, until a winning condition is met.

Step 1510. Occupation playing method.

In PVP tile-matching game battle playing methods provided by the game platform, the following four game mechanisms are provided: lattice occupation, specific skill, boss troubling, and lightening mode.

1. Lattice Occupation

It is a playing method in which a main winning means is to occupy lattices in a battle board by eliminating to-be-eliminated elements on the battle board.

Using a background color of a lattice as a placeholder identifier for example, a basic rule includes as follows:

(a) For example, a color of a current party is green. When an element on a lattice in the color of the current party interacts with another element and are eliminated, lattices with the eliminated elements turn in the background color of green. That is, provided that the lattices with the eliminated elements include the color of the current party, the color of the current party spreads to all the lattices with the eliminated elements.

(b) When a to-be-eliminated element on a lattice is eliminated, if the eliminated element is an obstacle element that cannot produce damage, the color of the current party does not spread to the lattice of the obstacle element. For example, the obstacle element may be a wooden box or a stone. After the wooden box is eliminated, the color of the current party cannot spread to the lattice of the wooden box. The obstacle element is an element that can be eliminated only by a special to-be-eliminated element, or the obstacle element is an element that needs to be eliminated by eliminating common to-be-eliminated elements a plurality of times.

(c) In an impact direction of an impact effect element, if an obstacle element is exploded and a lattice area of the obstacle element cannot be occupied, in a current elimination process, all lattices located behind the obstacle element cannot be occupied. For triangular or snowflake explosion elimination caused by some to-be-eliminated elements, elimination ranges are independently generated according to respective elimination logic.

(d) If elements having a special effect are switched and one of two lattices in the switching is in the color of the current party, the color of the current party may occupy all lattices corresponding to eliminated elements.

2. Specific Skill

Usually, a player triggers only one location switching instruction in each round. In this embodiment, the player may obtain an additional operation opportunity in each round by using a special elimination mechanism. The operation opportunity is an opportunity to additionally switch lattice locations of two to-be-eliminated elements. That is, in the special elimination mechanism, the player can perform one more switching operation.

The special elimination mechanism may be as follows: In a current round, if four or five elements are eliminated, the player obtains one additional operation opportunity. In a single round, the player can obtain a maximum of three additional operation opportunities, to avoid a special case that the player operates many times in one round and directly ends the battle.

Actions are timed. A timing mechanism is introduced to each operation opportunity. A timeout triggers switching to a next round. The timing mechanism is used for prompting the player to make a choice as soon as possible. In addition, because the additional operation opportunity mechanism is introduced to a single round, the single round is not timed, but instead, a single slide operation is timed.

For an additional operation opportunity, a time for a single operation opportunity needs to be recalculated.

Round switching means that when a player completes all moving operations, a quantity of rounds is subtracted by 1, and it switches to a round of an opponent for operation. For each battle, an overall time of the entire battle is controlled by using a maximum round quantity, to avoid a tie and failure to determine a winner.

3. Boss Troubling

A triggering condition is as follows: When a quantity of lattices occupied by either of two battle parties reaches 40% of a total quantity (of lattices, which is rounded up), a boss troubling skill mechanism of the game platform is triggered. For example, boss troubling skills include the following two skills:

1. A treasure chest is randomly presented in a board area. After the treasure chest is eliminated, a random element is presented. The random element includes a common element and/or an element having a special effect.

2. An obstacle element is randomly presented in a board area.

The randomly presented treasure chest element and obstacle element need to be configured in a server in advance. Optionally, using the obstacle element as an example, an obstacle type and presentation quantity need to be configured in the server.

Main configuration parameters include:

a parameter 1: how often a boss troubling skill is presented in rounds when the boss troubling mechanism is triggered; and a parameter 2: a type and quantity of elements presented in a boss troubling skill and configuration of falling lattices.

4. Lightening Mode

When the entire battling process is near a tie state, two parties are likely to repeatedly vie for some lattice areas. However, when the two parties have basically the same elimination efficiency, a prevailing party cannot win quickly, but hangs in there until a maximum quantity of rounds and ends the battle.

Therefore, in this embodiment, a lightening effect element is introduced to the tile-matching game as a special element, to improve normal elimination efficiency of a player, and get rid of impact of a layout on the board on the elimination efficiency.

The lightening mode starts in the last $k^{th}$ round of the maximum quantity of rounds, and based on the boss troubling mechanism, a configured quantity of lightening effect elements are sprinkled after a round ends.

The lightening effect element is the same as a common element, which has n colors and may be normally eliminated. After the lightening effect element is eliminated, a lightening elimination effect is triggered. The lightening elimination effect includes: performing elimination once on two random lattices in an opponent area, and updating the random lattices in the elimination to the color of the current player. If a quantity of lattices occupied by an opponent is less than the random quantity, the game platform additionally selects lattices that have not been occupied to perform the lightening elimination operation. If no corresponding area is found in the board, to-be-eliminated elements on any lattices are eliminated randomly.

Step 1511. Winner determining.

Using a background color of a lattice as the placeholder identifier for example, a background color of a lattice occupied by the first player is a first color, and a background color of a lattice occupied by the second player is a second color.

1. When all the lattices in the battle board are occupied by one party, the one party directly wins.

2. When a proportion of lattices occupied by one party reaches 80% (a percentage is chosen to be rounded up) of the entire battle board, the one party wins.

3. When rounds of the two parties end, a party occupying more lattices wins. When the two parties occupy the same quantity of lattices, a party having a higher elimination score wins.

A total quantity of rounds of each battle does not exceed a predetermined threshold. When the rounds of the two parties end, one of the two players occupying more lattices wins. If the two players occupy the same quantity of lattices, a party having a higher elimination score wins. The elimination score is a score generated when the player eliminates to-be-eliminated elements. An accumulation manner of the elimination score is not limited in this application.

4. When one party is disconnected/exits the single battle, the other party directly wins.

When the current player is disconnected or actively exits the battle, the game platform determines the other player as a winner.

5. When one party has more than three timeouts in a single battle, the other party is determined to win.

In each round, the game platform performs an operation countdown on a current player, if no location switching instruction is received from the current player until the operation countdown ends, the game platform determines the other player as a winner.

6. When the two parties are consistent in all data, a party starting later wins.

When the two player occupy the same quantity of lattices, the game platform determines that a party who starts later and has operation permission in the last round wins.

Figure 18:
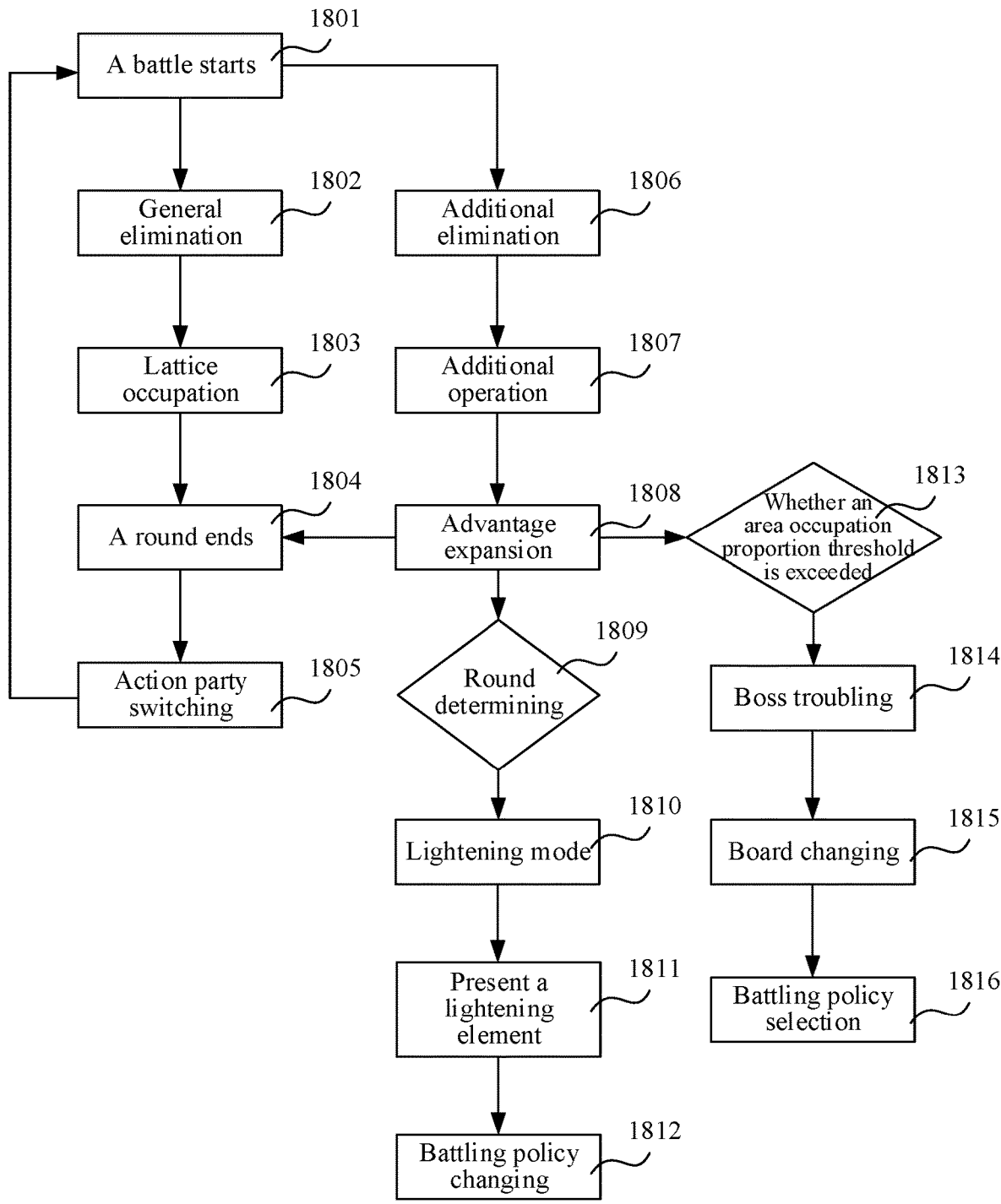
FIG. 18 is a flowchart of a method for displaying a battle interface in a terminal according to an exemplary embodiment of this application.

In an example, a method for displaying a battle interface in a terminal according to an embodiment of this application is shown in FIG. 18:

Step 1801. A battle starts.

A server transmits a battle start signal to terminals respectively corresponding to at least two accounts. After receiving the battle start signal, the terminals respectively corresponding to the at least two accounts operate in respective rounds to eliminate to-be-eliminated elements.

In the $i^{th}$ round of n rounds, n and i being natural numbers and $1 \leq i \leq n$, after receiving an $i^{th}$ location switching instruction transmitted by a target terminal corresponding to a target account, the server detects, after locations of a first to-be-eliminated element and a second to-be-eliminated element are switched according to the $i^{th}$ location switching instruction, whether the eliminated elements meet an additional elimination condition. If the additional elimination condition is not met, step 1802 is performed. If the additional elimination condition is met, step 1806 is performed.

Step 1802. General elimination.

The server switches display locations of the first to-be-eliminated element and the second to-be-eliminated element in board data according to the $i^{th}$ location switching instruction, determines to-be-eliminated elements needing to be eliminated, and then transmits an elimination instruction to the terminals respectively corresponding to the at least two accounts. After receiving the elimination instruction, the terminals respectively corresponding to the at least two accounts display switching of the locations of the first to-be-eliminated element and the second to-be-eliminated element, and eliminate the to-be-eliminated elements determined to be eliminated. Then step 1803 is performed.

Step 1803. Lattice occupation.

The server detects whether lattices corresponding to eliminated elements (if the general elimination is performed in the $i^{th}$ round, the eliminated elements includes the to-be-eliminated elements eliminated according to the $i^{th}$ location switching instruction; if the $i^{th}$ round includes additional elimination, the eliminated elements further include additional to-be-eliminated elements eliminated according to an additional location switching instruction) display a first placeholder identifier corresponding to the target account, and transmits a placeholder display instruction to the terminals respectively corresponding to the at least two accounts if the lattices corresponding to the eliminated elements display the first placeholder identifier. The terminals respectively corresponding to the at least two accounts display the first placeholder identifier on the lattices corresponding to the eliminated elements according to the placeholder display instruction. The lattices corresponding to the eliminated elements in the $i^{th}$ round are lattices occupied by the target account. Then step 1804 is performed.

Step 1804. The $i^{th}$ round ends. Then step 1805 is performed.

Step 1805. Action party switching.

The server determines to start the $(i+1)^{th}$ round corresponding to another account, and receives an $(i+1)^{th}$ location switching instruction transmitted by another terminal corresponding to the another account.

Step 1806. Additional elimination.

After determining that the eliminated elements meet an additional elimination condition, the server transmits an elimination instruction to the terminals respectively corresponding to the at least two accounts, and transmits an additional elimination instruction to the target terminal. The terminals respectively corresponding to the at least two accounts display the switching of the locations of the first to-be-eliminated element and the second to-be-eliminated element, and eliminate the to-be-eliminated elements determined to be eliminated after the first to-be-eliminated element and the second to-be-eliminated element are switched.

Step 1807. Additional operation.

After receiving the additional elimination instruction, the target terminal switches locations of a third to-be-eliminated element and a fourth to-be-eliminated element, and transmits an additional location switching instruction to the server.

Step 1808. Advantage expansion.

The server determines, according to the additional location switching instruction, additional to-be-eliminated elements needing to be eliminated after the third to-be-eliminated element and the fourth to-be-eliminated element are switched, and transmits an additional elimination display instruction to the terminals respectively corresponding to the at least two accounts. After receiving the additional elimination display instruction, the terminals respectively corresponding to the at least two accounts display the switching of the locations of the third to-be-eliminated element and the fourth to-be-eliminated element, and additionally eliminate the additional to-be-eliminated elements. Then step 1804, step 1809, or step 1813 is performed.

Step 1809. Round determining.

The server detects whether the $i^{th}$ round is one of the last several rounds of the n rounds. If the $i^{th}$ round is one of the last several rounds of the n rounds, step 1810 is performed.

Step 1810. Lightening mode.

When the $i^{th}$ round is one of the last several rounds of the n rounds, the server determines that the battle enters the lightening mode, and transmits a lightening effect element configuration instruction to the terminals respectively corresponding to the at least two accounts.

For example, game development personnel configure the lightening mode according to the following Table 1:

TABLE 1

| Presentation type | Presentation element | Falling point | Data 1 | Data 2 |
|---|---|---|---|---|
| External monster skill pool - use in a specific step | Random lightening | External monster A (6, 5) | 6 | 8 |
| External monster skill pool - use in a specific step | Random lightening | External monster A (6, 5) | 5 | 8 |

The first entry of Table 1 indicates that a lightening effect element is added in the last sixth round in a manner that an external monster sprinkles the element. The "presentation type" correspondingly indicates a note (it is used in the last sixth round when an external monster is triggered to use a skill selected from a skill pool) of the entry content. The "presentation element" correspondingly indicates that a falling element is a random lightening effect element. The "falling point" correspondingly indicates a monster type (external monster A) and a location (coordinates (6, 5) on a board) on which the lightening effect element falls. The "data 1" is a lightening mode triggering condition (the last sixth round). The "data 2" is a quantity (8) of falling elements.

The second entry of Table 1 indicates that a lightening effect element is added in the last fifth round in a manner that an external monster sprinkles an element. The "presentation type" correspondingly indicates a note (it is used in the last fifth round when an external monster is triggered to use a skill selected from a skill pool) of the entry content. The "presentation element" correspondingly indicates that a falling element is a random lightening effect element. The "falling point" correspondingly indicates a monster type (external monster A) and a location (coordinates (6, 5) on a board) on which the lightening effect element falls. The "data 1" is a lightening mode triggering condition (the last fifth round). The "data 2" is a quantity (8) of falling elements.

Step 1811. Lightening effect element presentation.

After receiving the lightening effect element configuration instruction, the target terminal and another terminal additionally display a lightening effect element on the battle board randomly.

Step 1812. Battling policy changing.

Because the lightening effect element is presented, battle policies of the at least two accounts change, and they may choose to eliminate the lightening effect element first.

Step 1813. Detect whether an area occupation proportion threshold is exceeded.

The server detects whether a proportion of lattices occupied by the target account in all lattices in the battle board exceeds the area occupation proportion threshold. If the proportion of the lattices occupied by the target account in all the lattices in the battle board exceeds the area occupation proportion threshold, step 1814 is performed.

Step 1814. Boss troubling.

The server determines that the battle enters a boss troubling mode, and in the boss troubling mode, determines to randomly add a treasure chest element or an obstacle element to the battle board.

For example, game development personnel configure the boss troubling mode according to the following Table 2:

TABLE 2

| Presentation type | Presentation element | Falling point | Data 1 | Data 2 |
|---|---|---|---|---|
| External monster skill pool - skill probability weight | Level-1 shield | External monster B (3, 4) | 40 | 6 |
| External monster - skill use probability | Level-1 shield | External monster B (3, 4) | 40 | 6 |

The first entry of Table 2 indicates that a type (a treasure chest element or an obstacle element) of an element added in the boss troubling mode in a falling manner. The "presentation type" correspondingly indicates a note (an element is selected from the external monster skill pool according to the skill probability weight) of the entry content. The "presentation element" correspondingly indicates that a falling element is a level-1 shield (an obstacle element). The "falling point" correspondingly indicates a boss type (external monster B) and a location (coordinates (3, 4) on a board) on which the element falls. The "data 1" is a boss troubling mode triggering condition (the area occupation proportion threshold is 40%). The "data 2" is a quantity (6) of falling elements.

The second entry of Table 2 indicates that a triggering condition of falling a level-1 shield in the boss troubling mode. The "presentation type" correspondingly indicates a note (a probability that the external monster uses a skill) of the entry content. The "presentation element" correspondingly indicates that a probability weight corresponding to the skill. The "falling point" indicates a boss type (the external monster B) and a location (coordinates (3, 4) on a board) on which the element falls. The "data 1" is a boss troubling mode triggering condition (the area occupation proportion threshold is 40%). The "data 2" is a quantity (6) of falling elements.

Step 1815. Board changing.

After receiving the display update instruction transmitted by the server, the terminals corresponding to the at least two accounts display, on the battle board, a treasure chest element determined by the server.

Step 1816. Battling policy selection.

Because the treasure chest element is presented, the at least two accounts choose whether to eliminate the treasure chest element accordingly.

In the foregoing embodiment, placeholder identifiers of the lattices may cover each other, an account acting in a current round may occupy a lattice that is occupied by another account in a previous round.

Figure 19:
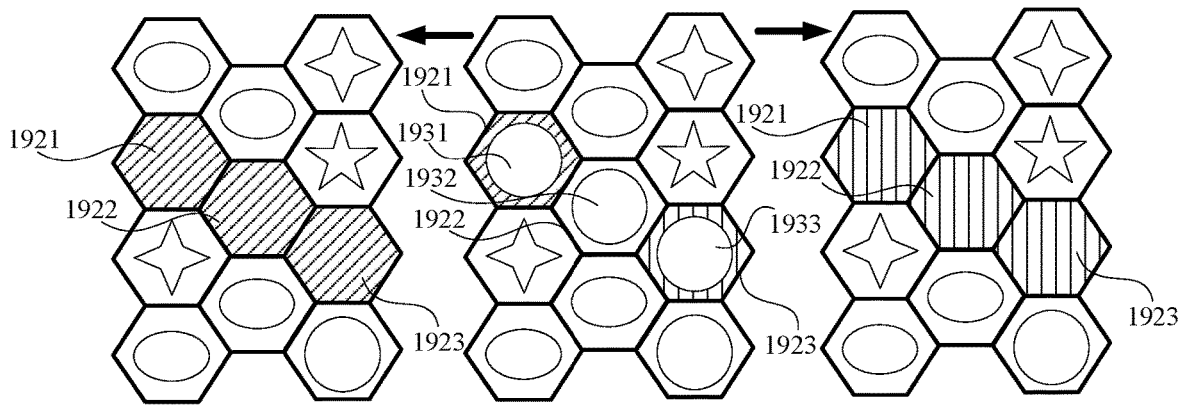
FIG. 19 is a schematic diagram of lattice occupancy and coverage according to an exemplary embodiment of this application.

As shown in the middle of FIG. 19, a lattice 1921 displays a to-be-eliminated element 1931 and a first placeholder identifier corresponding to a first account, a lattice 1922 displays a to-be-eliminated element 1932, and a lattice 1923 displays a to-be-eliminated element 1933 and a second placeholder identifier corresponding to a second account. If a current round is a round in which the first account has operation permission, after the to-be-eliminated elements 1931, 1932, and 1933 are eliminated, the lattices 1921, 1922, 1933 display the first placeholder identifier, as shown in the left of FIG. 19. If a current round is a round in which the second account has operation permission, after the to-be-eliminated elements 1931, 1932, and 1933 are eliminated, the lattices 1921, 1922, 1933 display the second placeholder identifier, as shown in the right of FIG. 19.

Figure 20:
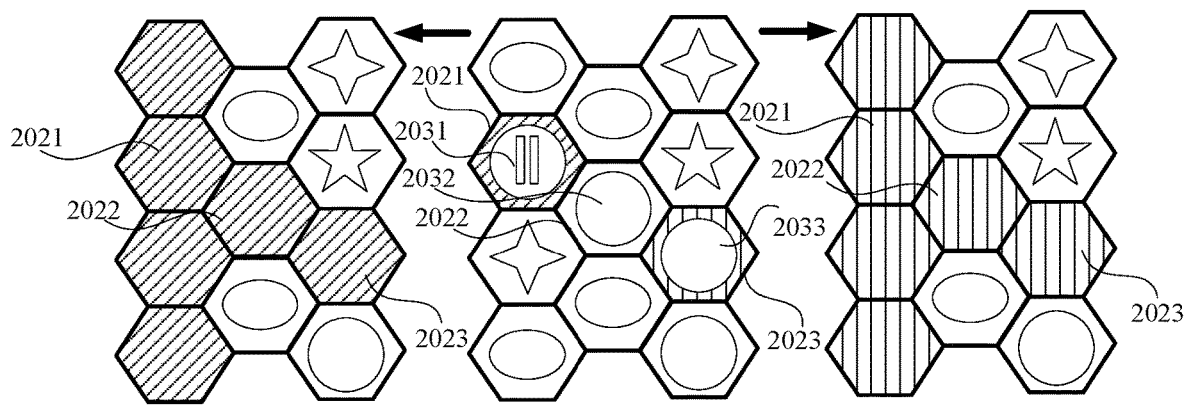
FIG. 20 is a schematic diagram of lattice occupancy and coverage according to an exemplary embodiment of this application.

As shown in the middle of FIG. 20, a lattice 2021 displays an impact effect element 2031 and a first placeholder identifier corresponding to a first account, a lattice 2022 displays a to-be-eliminated element 2032, and a lattice 2023 displays a to-be-eliminated element 2033 and a second placeholder identifier corresponding to a second account. If a current round is a round in which the first account has operation permission, after the impact effect element 2031 and the to-be-eliminated elements 2032 and 2033 are eliminated, the lattices 2021, 2022, 2033 and a column in which the impact effect element 2031 is located display the first placeholder identifier, as shown in the left of FIG. 20. If a current round is a round in which the second account has operation permission, after the impact effect element 2031 and the to-be-eliminated elements 2032 and 2033 are eliminated, the lattices 2021, 2022, 2033 and a column in which the impact effect element 2031 is located display the second placeholder identifier, as shown in the right of FIG. 20.

Figure 21:
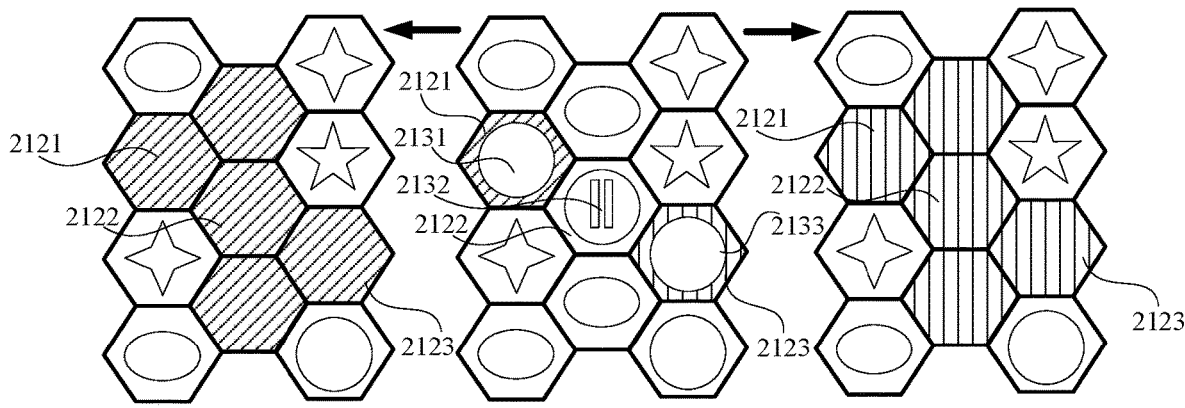
FIG. 21 is a schematic diagram of lattice occupancy and coverage according to an exemplary embodiment of this application.

As shown in the middle of FIG. 21, a lattice 2121 displays an impact effect element 2131 and a first placeholder identifier corresponding to a first account, a lattice 2122 displays a to-be-eliminated element 2132, and a lattice 2123 displays a to-be-eliminated element 2133 and a second placeholder identifier corresponding to a second account. If a current round is a round in which the first account has operation permission, after the impact effect element 2132 and the to-be-eliminated elements 2131 and 2133 are eliminated, the lattices 2121, 2122, 2133 and a column in which the impact effect element 2132 is located display the first placeholder identifier, as shown in the left of FIG. 21. If a current round is a round in which the second account has operation permission, after the impact effect element 2132 and the to-be-eliminated elements 2131 and 2133 are eliminated, the lattices 2121, 2122, 2133 and a column in which the impact effect element 2132 is located display the second placeholder identifier, as shown in the right of FIG. 21.

Figure 22:
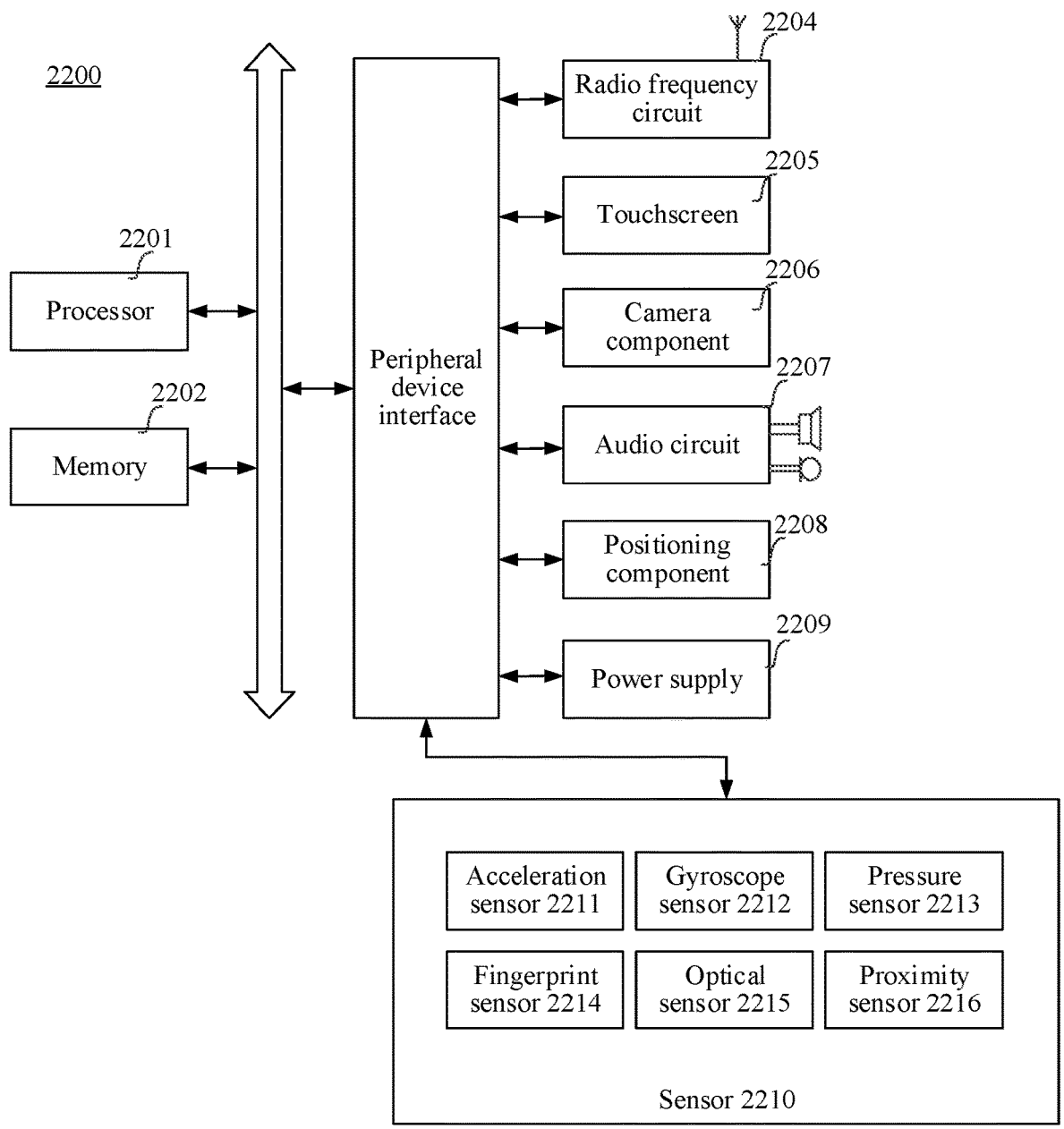
FIG. 22 is a block diagram of a terminal according to an embodiment of this application.

FIG. 22 is a structural block diagram of a terminal 2200 according to an exemplary embodiment of this application. The terminal 2200 may be a portable mobile terminal, for example, a smartphone, a tablet computer, an MP3 player, or an MP4 player. The terminal 2200 may also be referred to as other names such as user equipment and a portable terminal.

Generally, the terminal 2200 includes a processor 2201 and a memory 2202.

The processor 2201 includes one or more processing cores, for example, a 4-core processor or an 8-core processor. The processor 2201 may be implemented in at least one hardware form of a digital signal processor (DSP), a field-programmable gate array (FPGA), and a programmable logic array (PLA). The processor 2201 may alternatively include a main processor and a coprocessor. The main processor is configured to process data in an active state, which is also referred to as a central processing unit (CPU). The coprocessor is a low-power processor configured to process data in a standby state. In some embodiments, the processor 2201 may be integrated with a graphics processing unit (GPU). The GPU is responsible for rendering and drawing content to be displayed by a display screen. In some embodiments, the processor 2201 may further include an artificial intelligence (AI) processor. The AI processor is configured to process a calculation operation related to machine learning.

The memory 2202 may include one or more non-volatile computer-readable storage media. The non-volatile computer-readable storage medium may be tangible and non-transient. The memory 2202 may further include a high-speed random access memory (RAM), and a non-volatile memory such as one or more magnetic disk storage devices and a flash memory device. In some embodiments, the non-transient non-volatile computer-readable storage medium in the memory 2202 is configured to store at least one instruction, the at least one instruction being configured to be executed by the processor 2201 to implement the method for displaying a battle interface in a terminal according to this application.

In some embodiments, the terminal 2200 may further optionally include a peripheral device interface 2203 and at least one peripheral device. Specifically, the peripheral device includes at least one of a radio frequency (RF) circuit 2204, a touchscreen 2205, a camera component 2206, an audio circuit 2207, a positioning component 2208, and a power supply 2209.

The peripheral device interface 2203 may be configured to connect the at least one peripheral device related to input/output (I/O) to the processor 2201 and the memory 2202. In some embodiments, the processor 2201, the memory 2202 and the peripheral device interface 2203 are integrated on the same chip or circuit board. In some other embodiments, any one or two of the processor 2201, the memory 2202, and the peripheral device interface 2203 may be implemented on a single chip or circuit board. This is not limited in this embodiment.

The RF circuit 2204 is configured to receive and transmit an RF signal, which is also referred to as an electromagnetic signal. The RF circuit 2204 communicates with a communications network and other communications devices by using the electromagnetic signal. The RF circuit 2204 converts an electrical signal into an electromagnetic signal to be transmitted, or converts a received electromagnetic signal into an electrical signal. Optionally, the RF circuit 2204 includes: an antenna system, an RF transceiver, one or more amplifiers, a tuner, an oscillator, a DSP, a codec chipset, a subscriber identity module card, and the like. The RF circuit 2204 may communicate with other terminals through at least one wireless communication protocol. The wireless communication protocol includes, but is not limited to, the World Wide Web, a metropolitan area network, an intranet, (2G, 3G, 4G, and 5G) mobile communications networks, a wireless local area network, and/or a wireless fidelity (Wi-Fi) network. In some embodiments, the RF circuit 2204 may further include a near field communication (NFC)-related circuit, which is not limited in this application.

The touchscreen 2205 is configured to display a UI. The UI may include a graphic, a text, an icon, a video, and any combination thereof. The touchscreen 2205 also has a capability of collecting a touch signal on or above a surface of the touchscreen 2205. The touch signal may be used as a control signal to be inputted into the processor 2201 for processing. The touchscreen 2205 is configured to provide a virtual button and/or a virtual keyboard, which is also referred to as a soft button and/or a soft keyboard. In some embodiments, there may be one touchscreen 2205, disposed on a front panel of the terminal 2200. In some other embodiments, there may be at least two touchscreens 2205, disposed on different surfaces of the terminal 2200 respectively or in a folded design. In some more embodiments, the touchscreen 2205 may be a flexible display screen, disposed on a curved surface or a folded surface of the terminal 2200. Even, the touchscreen 2205 may be further arranged in a non-rectangular irregular shape, namely, a special-shaped screen. The touchscreen 2205 may be made of a material such as a liquid crystal display (LCD) or an organic light-emitting diode (OLED).

The camera component 2206 is configured to acquire an image or a video. Optionally, the camera component 2206 includes a front-facing camera and a rear-facing camera. Generally, the front-facing camera is configured to implement a video call or self-portrait. The rear-facing camera is configured to shoot a picture or a video. In some embodiments, there are at least two rear-facing cameras, each of which is any one of a main camera, a depth of field camera and a wide-angle camera, so as to implement a background blurring function by fusing the main camera and the depth of field camera, and panoramic shooting and virtual reality (VR) shooting functions by fusing the main camera and the wide-angle camera. In some embodiments, the camera component 2206 may further include a flash. The flash may be a single color temperature flash or a double color temperature flash. The double color temperature flash refers to a combination of a warm flash and a cold flash, and may be configured to perform light compensation at different color temperatures.

The audio circuit 2207 is configured to provide an audio interface between a user and the terminal 2200. The audio circuit 2207 may include a microphone and a speaker. The microphone is configured to collect sound waves of a user and an environment, and convert the sound waves into electrical signals to be inputted to the processor 2201 for processing, or to be inputted to the RF circuit 2204 for implementing voice communication. For the purpose of stereo collection or noise reduction, there may be a plurality of microphones, disposed at different portions of the terminal 2200 respectively. The microphone may be an array microphone or an omni-directional collection type microphone. The speaker is configured to convert an electrical signal from the processor 2201 or the RF circuit 2204 into a sound wave. The speaker may be a conventional film speaker, or may be a piezoelectric ceramic speaker. When the speaker is the piezoelectric ceramic speaker, electric signals not only can be converted into sound waves that can be heard by human, but also can be converted into sound waves that cannot be heard by human for ranging and the like. In some embodiments, the audio circuit 2207 may further include an earphone jack.

The positioning component 2208 is configured to position a current geographic location of the terminal 2200, to implement navigation or a location based service (LBS). The positioning component 2208 may be a positioning component based on the global positioning system (GPS) of the United States, the Beidou system of China, or the Galileo system of Russia.

The power supply 2209 is configured to supply power to components in the terminal 2200. The power supply 2209 may be an alternating current, a direct current, a primary battery, or a rechargeable battery. When the power supply 2209 includes a rechargeable battery, the rechargeable battery may be a wired charged battery or a wireless charged battery. The wired charged battery is a battery charged through a wired line, and the wireless charged battery is a battery charged through a wireless coil. The rechargeable battery may be further configured to support a quick charge technology.

In some embodiments, the terminal 2200 further includes one or more sensors 2210. The one or more sensors 2210 include, but are not limited to, an acceleration sensor 2211, a gyroscope sensor 2212, a pressure sensor 2213, a fingerprint sensor 2214, an optical sensor 2215, and a proximity sensor 2216.

The acceleration sensor 2211 may detect acceleration on three coordinate axes of a coordinate system established by the terminal 2200. For example, the acceleration sensor 2211 may be configured to detect components of gravity acceleration on the three coordinate axes. The processor 2201 may control, according to a gravity acceleration signal collected by the acceleration sensor 2211, the display screen 2205 to display the UI in a landscape view or a portrait view. The acceleration sensor 2211 may be further configured to collect motion data of a game or a user.

The gyroscope sensor 2212 may detect a body direction and a rotation angle of the terminal 2200. The gyroscope sensor 2212 may cooperate with the acceleration sensor 2211 to collect a 3D action performed by the user on the terminal 2200. The processor 2201 may implement the following functions according to the data collected by the gyroscope sensor 2212: motion sensing (such as changing the UI according to a tilt operation of the user), image stabilization at shooting, game control, and inertial navigation.

The pressure sensor 2213 may be disposed at a side frame of the terminal 2200 and/or a lower layer of the touchscreen 2205. When the pressure sensor 2213 is disposed at the side frame of the terminal 2200, a holding signal of the user on the terminal 2200 may be detected, and left/right hand identification and a quick action may be performed according to the holding signal. When the pressure sensor 2213 is disposed at the lower layer of the touchscreen 2205, an operable control on the UI interface can be controlled according to a pressure operation of the user on the touchscreen 2205. The operable control includes at least one of a button control, a scroll-bar control, an icon control, and a menu control.

The fingerprint sensor 2214 is configured to collect a user's fingerprint to identify a user's identity according to the collected fingerprint. When identifying that the user's identity is a trusted identity, the processor 2201 authorizes the user to perform related sensitive operations. The sensitive operations include: unlocking the screen, viewing encrypted information, downloading software, making a payment, changing a setting, and the like. The fingerprint sensor 2214 may be disposed on a front surface, a back surface, or a side surface of the terminal 2200. When a physical button or a vendor logo is disposed on the terminal 2200, the fingerprint sensor 2214 may be integrated with the physical button or the vendor logo.

The optical sensor 2215 is configured to collect ambient light intensity. In an embodiment, the processor 2201 may control display luminance of the display screen 2205 according to the ambient light intensity collected by the optical sensor 2215. Specifically, when the ambient light intensity is relatively high, the display luminance of the display screen 2205 is increased. When the ambient light intensity is relatively low, the display luminance of the display screen 2205 is reduced. In another embodiment, the processor 2201 may further dynamically adjust shooting parameters of the camera component 2206 according to the ambient light intensity collected by the optical sensor 2215.

The proximity sensor 2216, also referred to as a distance sensor, is generally disposed on the front surface of the terminal 2200. The proximity sensor 2216 is configured to collect a distance between the user and the front surface of the terminal 2200. In an embodiment, when the proximity sensor 2216 detects that the distance between the user and the front surface of the terminal 2200 gradually becomes smaller, the touchscreen 2205 is controlled by the processor 2201 to switch from a screen-on state to a screen-off state. When the proximity sensor 2216 detects that the distance between the user and the front surface of the terminal 2200 gradually becomes larger, the touchscreen 2205 is controlled by the processor 2201 to switch from the screen-off state to the screen-on state.

Figure 23:
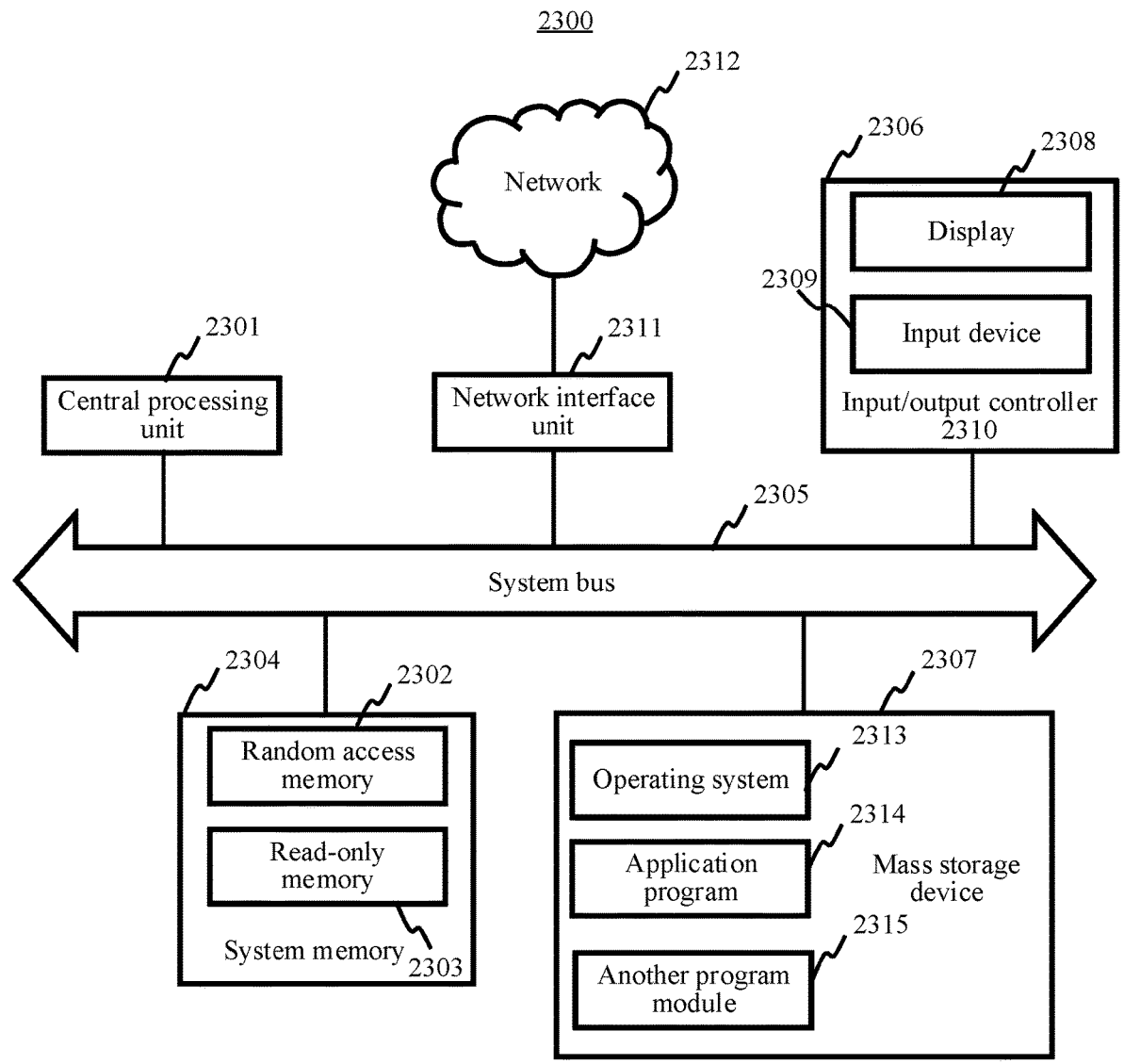
FIG. 23 is a block diagram of a computer device according to an exemplary embodiment of this application.

A person skilled in the art may understand that the structure shown in FIG. 22 does not constitute a limitation to the terminal 2200, and the terminal may include more or fewer components than those shown in the figure, or some components may be combined, or a different component deployment may be used FIG. 23 is a schematic structural diagram of a computer device according to an embodiment of this application. The computer device is configured to implement the server-side method for displaying a battle interface in a terminal according to the foregoing embodiment. The computer device may be at least one server in the server system 120 in the embodiment shown in FIG. 1. Specifically:

The computer device 2300 includes a CPU 2301, a system memory 2304 including a RAM 2302 and a read-only memory (ROM) 2303, and a system bus 2305 connecting the system memory 2304 and the CPU 2301. The computer device 2300 further includes a basic I/O system 2306 configured to transmit information between components in a computer, and a mass storage device 2307 configured to store an operating system 2313, an application program 2314, and another program module 2315.

The basic I/O system 2306 includes a display 2308 configured to display information and an input device such as a mouse or a keyboard that is configured for information inputting by a user. The display 2308 and the input device 2309 are both connected to the CPU 2301 by using an I/O controller 2310 connected to the system bus 2305. The basic I/O system 2306 may further include the I/O controller 2310, for receiving and processing an input from a plurality of other devices such as a keyboard, a mouse, or an electronic stylus. Similarly, the I/O controller 2310 further provides an output to a display screen, a printer, or another type of output device.

The mass storage device 2307 is connected to the CPU 2301 by using a mass storage controller (not shown) connected to the system bus 2305. The mass storage device 2307 and an associated computer-readable medium provide non-volatile storage for the computer device 2300. That is, the mass storage device 2307 may include a computer-readable medium (not shown) such as a hard disk drive or a CD-ROM driver.

In general, the computer-readable medium may include a computer storage medium and a communications medium. The computer-readable storage medium includes volatile and non-volatile, removable and non-removable media that store information such as computer-readable instructions, data structures, program modules, or other data and that are implemented by using any method or technology. The computer-readable storage medium includes a RAM, a ROM, an EPROM, an EEPROM, a flash memory, or another solid state storage technology, a CD-ROM, a DVD, or another optical storage, a magnetic cassette, a magnetic tape, a magnetic disk storage, or another magnetic storage device. Certainly, it may be known by a person skilled in the art that the computer-readable storage medium is not limited to the foregoing several types. The system memory 2304 and the mass storage device 2307 may be collectively referred to as a memory.

According to the embodiments of this application, the computer device 2300 may further be connected to a remote computer on the network through a network such as the Internet. That is, the computer device 2300 may be connected to a network 2312 by using a network interface unit 2311 connected to the system bus 2305, or may be connected to another type of network or a remote computer system (not shown) by using the network interface unit 2311.

The memory further includes one or more processors. The one or more programs are stored in the memory and configured to be executed by one or more processors. The one or more programs include instructions used for performing the method for displaying a battle interface in a terminal according to the foregoing embodiment.

This application further provides a non-volatile computer-readable storage medium, storing at least one computer-readable instruction, at least one program, and a code set or an instruction set, the at least one computer-readable instruction, the at least one program, and the code set or the instruction set being loaded and executed by a processor to implement the method for displaying a battle interface in a terminal according to the foregoing embodiment.

Optionally, this application further provides a computer program product including an instruction, the computer program product, when run on a computer, causing the computer to perform the method for displaying a battle interface in a terminal according to the foregoing aspects.

It is to be understood that "plurality of" mentioned in the specification means two or more. In addition, "and/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects.

The sequence numbers of the foregoing embodiments of this application are merely for description purpose, and do not indicate the preference among the embodiments.

A person of ordinary skill in the art may understand that all or some of steps of the embodiments may be implemented by hardware or a program instructing related hardware. The program may be stored in a non-volatile computer-readable storage medium. The computer-readable storage medium may be a ROM, a magnetic disk, an optical disc, or the like.

The foregoing descriptions are merely exemplary embodiments of this application, but are not intended to limit this application. Any modification, equivalent replacement, or improvement made without departing from the spirit and principle of this application shall fall within the protection scope of this application.

What is claimed is:

1. A method for displaying a battle interface in a terminal, performed by a server, the method comprising:
   recording board data of a battle board, the battle board comprising a plurality of arrayed lattices, and the board data comprising to-be-eliminated elements and placeholder identifiers displayed on the lattices;
   receiving, in an $i^{th}$ round of n rounds, an $i^{th}$ location switching instruction from a target terminal corresponding to a target account,
   the $i^{th}$ location switching instruction comprising an instruction to switch locations of a first to-be-eliminated element and a second to-be-eliminated element that are adjacent,
   the n rounds being operation timing units during which at least two accounts alternately have operation permission,
   the at least two accounts comprising the target account, and
   the $i^{th}$ round being a round in which the target account has operation permission, n being a natural number, i being a natural number, and $1 \leq i \leq n$;
   switching display locations of the first to-be-eliminated element and the second to-be-eliminated element in the board data according to the $i^{th}$ location switching instruction;
   synchronously transmitting a first instruction to terminals respectively corresponding to the at least two accounts in response to a predetermined quantity of to-be-eliminated elements with the same type are connected after the locations of the first to-be-eliminated element and the second to-be-eliminated element are switched, the first instruction comprising an instruction to eliminate connected eliminated elements with the same type, the terminals comprising the target terminal;
   synchronously transmitting a second instruction to the terminals respectively corresponding to the at least two accounts in response to the eliminated elements comprising an element having a first placeholder identifier, the second instruction comprising an instruction to display placeholder identifiers of lattices corresponding to the eliminated elements as the first placeholder identifier, the first placeholder identifier being a placeholder identifier corresponding to the target account;
   determining a winner among the at least two accounts according to the placeholder identifiers of the lattices on the battle board and a winning condition; and
   transmitting a third instruction to the terminals respectively corresponding to the at least two accounts, the third instruction comprising an instruction to display the winner.

2. The method of claim 1, further comprising:
   in response to the eliminated elements comprising an impact effect element, determining an impact range corresponding to the impact effect element in the battle board according to a lattice location and an impact direction corresponding to the impact effect element; and
   transmitting a fourth instruction to the terminals respectively corresponding to the at least two accounts, the fourth instruction comprising an instruction to eliminate a to-be-eliminated element within the impact range and display a placeholder identifier of a lattice within the impact range as the first placeholder identifier.

3. The method of claim 2, further comprising:
   determining updated to-be-eliminated elements for the lattices corresponding to the eliminated elements;
   in response to the updated to-be-eliminated elements comprising an impact effect element, determining an impact range corresponding to the impact effect element in the battle board according to a lattice location and an impact direction corresponding to the impact effect element;
   transmitting a fifth instruction to the terminals respectively corresponding to the at least two accounts, the fifth instruction comprising instructions to:
   display the updated to-be-eliminated elements,
   eliminate a to-be-eliminated element within the impact range corresponding to the impact effect element, and
   display a placeholder identifier of a lattice within the impact range as the first placeholder identifier.

4. The method of claim 2, further comprising:
   in response to an obstacle element being present in the impact direction, determining that the impact range comprises a first lattice between the obstacle element and an edge to-be-eliminated element in a board column or row in the impact direction, the first lattice comprising a lattice of the impact effect element; and
   in response to no obstacle element being present in the impact direction, determining that the impact range comprises all lattices in the board column or row in the impact direction.

5. The method of claim 1, further comprising:
   determining to display updated to-be-eliminated elements comprising an impact effect element on the lattices corresponding to the eliminated elements in response to the eliminated elements meeting an addition condition;
   transmitting a fifth instruction to the terminals corresponding to the at least two accounts, the fifth instruction comprising instructions to display the updated to-be-eliminated elements;
   receiving, in the $i^{th}$ round, an additional location switching instruction for switching locations of a third to-be-eliminated element and a fourth to-be-eliminated element that are adjacent from the target terminal; and
   switching the third to-be-eliminated element and the fourth to-be-eliminated element in the board data according to the additional location switching instruction;
   wherein the addition condition comprising a quantity of the eliminated elements being greater than a first quantity threshold or the eliminated elements comprising an addition effect element.

6. A non-volatile computer-readable storage medium, storing a computer-readable instruction, the computer-readable instruction, when executed by one or more processors, causing the one or more processors to:
   record board data of a battle board, the battle board comprising a plurality of arrayed lattices, and the board data comprising to-be-eliminated elements and placeholder identifiers displayed on the lattices;
   receive, in an $i^{th}$ round of n rounds, an $i^{th}$ location switching instruction from a target terminal corresponding to a target account,
   the $i^{th}$ location switching instruction comprising an instruction to switch locations of a first to-be-eliminated element and a second to-be-eliminated element that are adjacent,
   the n rounds being operation timing units during which at least two accounts alternately have operation permission,
   the at least two accounts comprising the target account, and the $i^{th}$ round being a round in which the target account has operation permission, n being a natural number, i being a natural number, and 1≤i≤n;

switch display locations of the first to-be-eliminated element and the second to-be-eliminated element in the board data according to the $i^{th}$ location switching instruction;

synchronously transmit a first instruction to terminals respectively corresponding to the at least two accounts in response to a predetermined quantity of to-be-eliminated elements with the same type are connected after the locations of the first to-be-eliminated element and the second to-be-eliminated element are switched, the first instruction comprising an instruction to eliminate connected eliminated elements with the same type, the terminals comprising the target terminal;

synchronously transmit a second instruction to the terminals respectively corresponding to the at least two accounts in response to the eliminated elements comprising an element having a first placeholder identifier, the second instruction comprising an instruction to display placeholder identifiers of lattices corresponding to the eliminated elements as the first placeholder identifier, the first placeholder identifier being a placeholder identifier corresponding to the target account;

determine a winner among the at least two accounts according to the placeholder identifiers of the lattices on the battle board and a winning condition; and transmit a third instruction to the terminals respectively corresponding to the at least two accounts, the third instruction comprising an instruction to display the winner.

7. An apparatus for displaying a battle interface in a terminal, comprising:

a memory operable to store program code; and a processor operable to read the program code and configured to:

record board data of a battle board, the battle board comprising a plurality of arrayed lattices, and the board data comprising to-be-eliminated elements and placeholder identifiers displayed on the lattices;

receive, in an $i^{th}$ round of n rounds, an $i^{th}$ location switching instruction from a target terminal corresponding to a target account, the $i^{th}$ location switching instruction comprising an instruction to switch locations of a first to-be-eliminated element and a second to-be-eliminated element that are adjacent, the n rounds being operation timing units during which at least two accounts alternately have operation permission, the at least two accounts comprising the target account, and the $i^{th}$ round being a round in which the target account has operation permission, n being a natural number, i being a natural number, and 1≤i≤n;

switch display locations of the first to-be-eliminated element and the second to-be-eliminated element in the board data according to the $i^{th}$ location switching instruction;

synchronously transmit a first instruction to terminals respectively corresponding to the at least two accounts in response to a predetermined quantity of to-be-eliminated elements with the same type are connected after the locations of the first to-be-eliminated element and the second to-be-eliminated element are switched, the first instruction comprising an instruction to eliminate connected eliminated elements with the same type, the terminals comprising the target terminal;

synchronously transmit a second instruction to the terminals respectively corresponding to the at least two accounts in response to the eliminated elements comprising an element having a first placeholder identifier, the second instruction comprising an instruction to display placeholder identifiers of lattices corresponding to the eliminated elements as the first placeholder identifier, the first placeholder identifier being a placeholder identifier corresponding to the target account;

determine a winner among the at least two accounts according to the placeholder identifiers of the lattices on the battle board and a winning condition; and transmit a third instruction to the terminals respectively corresponding to the at least two accounts, the third instruction comprising an instruction to display the winner.

* * * * *